United States Patent
Imai et al.

(10) Patent No.: US 7,831,366 B2
(45) Date of Patent: Nov. 9, 2010

(54) VEHICLE SPEED CONTROL SYSTEM

(75) Inventors: Masato Imai, Ibaraki (JP); Hiroshi Sakamoto, Ibaraki (JP); Tatsuya Ochi, Ibaraki (JP); Takashi Okada, Ibaraki (JP); Toshimichi Minowa, Ibaraki (JP); Masao Sakata, Kanagawa (JP)

(73) Assignee: Xanavi Informatics Corporation, Zama-shi (JP)

( * ) Notice: Subject to any disclaimer, the term of this patent is extended or adjusted under 35 U.S.C. 154(b) by 600 days.

(21) Appl. No.: 11/773,133

(22) Filed: Jul. 3, 2007

(65) Prior Publication Data

US 2008/0059036 A1 Mar. 6, 2008

(30) Foreign Application Priority Data

Jul. 4, 2006 (JP) ............................. 2006-184017

(51) Int. Cl.
*G06F 19/00* (2006.01)
(52) U.S. Cl. .................................. 701/70; 701/208
(58) Field of Classification Search .................. 701/70, 701/208, 93
See application file for complete search history.

(56) References Cited

U.S. PATENT DOCUMENTS

| 5,315,295 | A | | 5/1994 | Fujii | |
|---|---|---|---|---|---|
| 6,138,084 | A | * | 10/2000 | Mine | 702/157 |
| 6,141,617 | A | * | 10/2000 | Matsuda et al. | 701/72 |
| 6,185,496 | B1 | * | 2/2001 | Matsuno | 701/70 |
| 6,970,779 | B2 | * | 11/2005 | Kagawa et al. | 701/93 |

FOREIGN PATENT DOCUMENTS

| JP | 4-236699 A | 8/1992 |
|---|---|---|
| JP | 2004-142686 A | 5/2004 |
| JP | 2004-351994 A | 12/2004 |

* cited by examiner

*Primary Examiner*—Mark Hellner
(74) *Attorney, Agent, or Firm*—Crowell & Moring LLP

(57) ABSTRACT

A vehicle speed control system includes: a unit for computing a first target velocity based on map information; a unit for computing a second target velocity based on a road profile obtained from other information than the map information (such as lane recognition using a camera); a unit for comparing the first target velocity and the second target velocity; a unit for selecting a lower target velocity therefrom; and a unit for controlling a vehicle velocity in accordance with the selected target velocity.

14 Claims, 23 Drawing Sheets

(a) Property of transition curve
(b) Distance to transition curve
(c) Distance to curve entrance

VEHICLE SPEED CONTROL SYSTEM

CROSS-REFERENCE TO RELATED APPLICATIONS

This application claims the foreign priority benefit under Title 35, United States Code, section 119 (a)-(d), of Japanese Patent Application No. 2006-184017, filed on Jul. 4, 2006 in the Japan Patent Office, the disclosure of which is herein incorporated by reference in its entirety.

BACKGROUND OF THE INVENTION

1. Field of the Invention

The present invention relates to a vehicle speed control system, and particularly to a vehicle speed control system that controls at least one of an engine, a transmission and a brake, in accordance with control parameters computed based on running environment ahead of the vehicle.

2. Description of the Related Art

Japanese unexamined patent publication No. H04-236699 discloses a system for realizing stable running by: extracting a road profile (for example, curved track) from map information stored in a navigation system that detects or estimates a driving route; setting a target velocity in accordance with properties of the curved track; and decelerating a vehicle before entering the curved track.

In a conventional navigation system mounted on a vehicle, a driving route is detected or estimated based on information of its own position of the vehicle received from the GPS (Global Positioning System, or satellite navigation system) and on a map DB (Data Base) stored in DVD-ROM, hard disk and the like. In order to realize the system disclosed in the above-mentioned patent document, high accuracy is required in the GPS and the map DB. However, in the system using the GPS, accuracy becomes markedly poor depending on the geographic features, due to occurrence of multipath or failure in satellite capture. In order to solve this problem, Japanese unexamined patent publication No. 2004-351994 discloses a method in which judgment is made on reliability of a road profile obtained from other information than the map information (for example, information obtained from objects installed along a road, such as white lines (lanes), delineators, guardrails and the like, detected using a camera, a radar and the like), and when the reliability is judged to be high, a target velocity calculated from the map information is corrected based on the road profile.

However, in the method disclosed in this patent document, the target velocity is corrected based on a result of reliability judgment on a road profile, and therefore, running stability may become poor depending on a road profile on which the vehicle is running. For example, suppose a vehicle enters a slow curve that leads to a sharp curve. When an imaging device, such as a camera, is used for recognizing lanes and the road profile is obtained based on a result of this recognition, and if the image is clear and the result of lane recognition is excellent, reliability of the road profile obtained by the camera is judged to be high. However, if the road is flanked by walls, the sharp curve is hidden behind the walls and the camera cannot capture the sharp curve ahead. Therefore, the judgment based merely on the result of lane recognition of the slow curve results in the judgment that no deceleration is required. In addition, there arises a problem in processing of the image obtained by the camera, that accuracy in computing information of distant road point becomes poor due to a limitation in resolution. For instance, if the target velocity is corrected in accordance with the road profile obtained by the camera, deceleration control is not performed, even though a target velocity computed from the map information stored in the navigation system indicates requirement of deceleration. Thereafter, when the vehicle enters the section where the sharp curve ahead can be detected based on the result of lane recognition by the camera, a target velocity required for deceleration is computed. However, a distance from the vehicle to the sharp curve is very short, and rapid deceleration is urged. The deceleration may not be completed before the vehicle reaches the sharp curve entrance, and running stability becomes markedly low. Therefore, it has been demanded to attain velocity control with high running stability, even in such a situation.

Therefore, it would be desirable to provide a method for highly stable velocity control which utilizes both map information stored in the navigation system and other information than the map information (for example, information of lane recognition by an imaging device, such as a camera).

SUMMARY OF THE INVENTION

In one aspect of the present invention, there is provided a vehicle speed control system including: a unit for computing a first target velocity based on map information; a unit for computing a second target velocity based on a road profile obtained from other information than the map information; and a unit for controlling a vehicle velocity based on the first target velocity and the second target velocity. Specifically, a lower target velocity is selected and the vehicle velocity is controlled in accordance with the selected target velocity.

For example, according to a first embodiment of the present invention, there is provided a vehicle speed control system including: a first acquisition part for acquiring a current position; a second acquisition part for acquiring map information; a sensor (for example, a device that can detect traffic lane, such as imaging device and radar); a first road profile estimating part for obtaining a first road profile ahead of the current position based on the map information; a first target velocity calculation part for computing a first target velocity based on the first road profile; a second road profile estimating part for obtaining a second road profile ahead of the current position based on information detected by the sensor, without using the map information; a second target velocity calculation part for computing a second target velocity based on the second road profile; and a velocity control part for comparing the first target velocity and the second target velocity, selecting a lower target velocity therefrom, and controlling a vehicle velocity in accordance with the selected target velocity.

According to a second embodiment of the present invention, there is provided a vehicle speed control system including: a first curvature radius information acquisition part for acquiring first curvature radius information based on map information; a second curvature radius information acquisition part for acquiring second curvature radius information based on a road profile obtained from other information than the map information; and a velocity control part for comparing the first curvature radius information and the second curvature radius information, selecting smaller curvature radius information therefrom, computing a target velocity based on the selected curvature radius information, and controlling a vehicle velocity in accordance with the computed target velocity.

According to a third embodiment of the present invention, there is provided a vehicle speed control system including: a first distance information acquisition part for acquiring first distance information from a current position to a specific point based on map information; a second distance information acquisition part for acquiring second distance information from the current position to the specific point based on a road profile obtained from other information than the map information; and a velocity control part for comparing the first distance information and the second distance information, selecting shorter distance information therefrom for decelerating a vehicle velocity or selecting longer distance information therefrom for accelerating a vehicle velocity, computing a target velocity based on the selected distance information and controlling the vehicle velocity in accordance with the computed target velocity.

According to the present invention, highly stable velocity control can be implemented by: comparing a target velocity computed based on map information and a target velocity computed based on other information than the map information; selecting a lower target velocity; and controlling a vehicle velocity in accordance with the selected target velocity.

In addition, by providing a notifying part that notifies information in advance to driver/passenger, secure feeling of the driver/passenger can be improved.

Moreover, by utilizing property of a transition section of a road, information of the road ahead of a range captive by a camera can be accurately predicted. By implementing velocity control based on the predicted information, improved feeling of stability and comfortability can be given to the driver/passenger.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Embodiments of the present invention will be described in detail below with reference to the drawings.

First Embodiment

Figure 1:
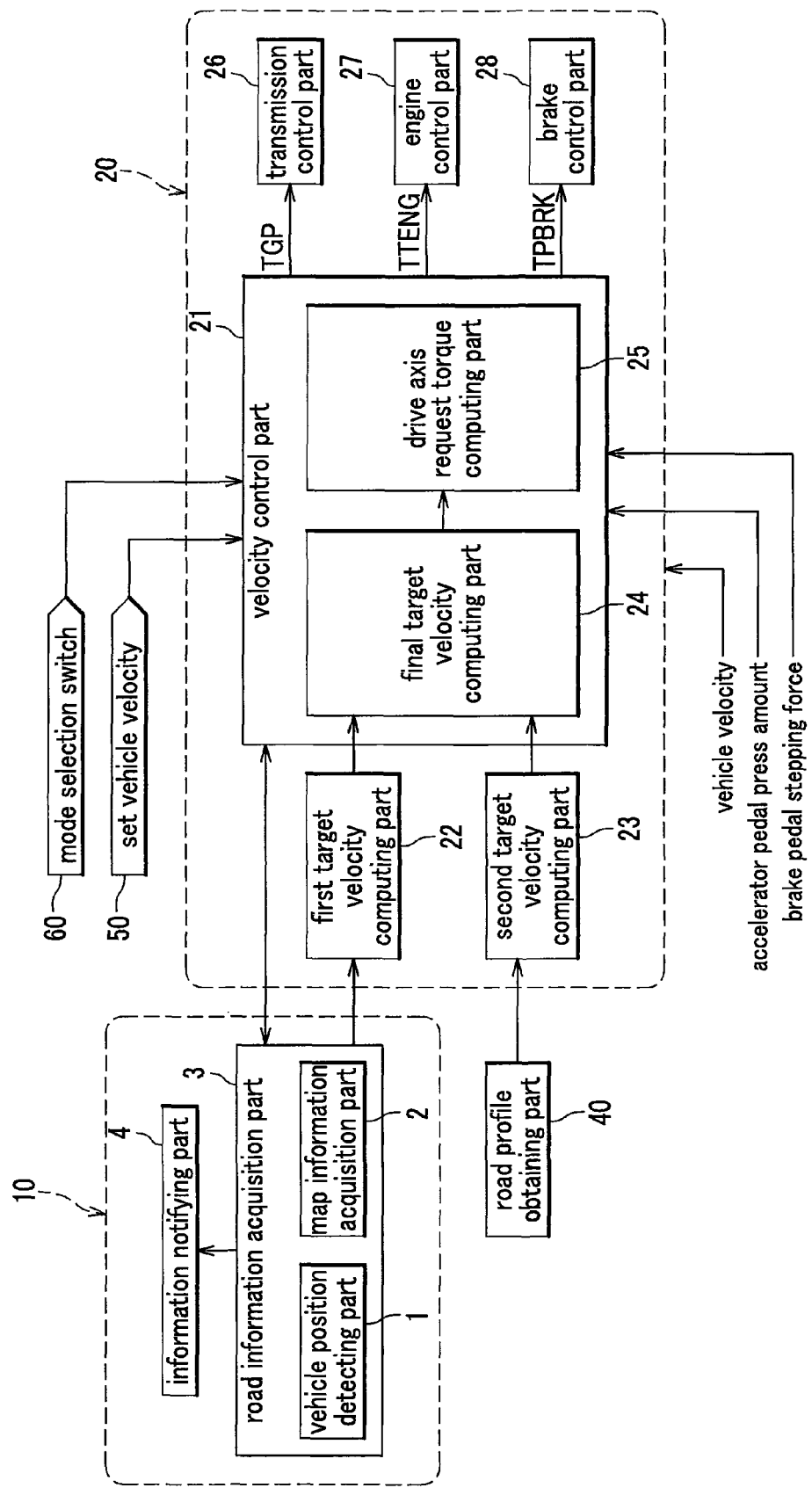
FIG. 1 is a schematic diagram showing a vehicle speed control system according to a first embodiment of the present invention.

FIG. 1 is a schematic diagram showing a vehicle speed control system according to a first embodiment of the present invention.

In the following descriptions, a "first acquisition part" corresponds to, for example, a vehicle position detecting part 1. A "second acquisition part" corresponds to, for example, a map information acquisition part 2. A "first road profile estimating part" corresponds to, for example, a road information acquisition part 3. A "second road profile estimating part" corresponds to, for example, a road profile obtaining part 40. A "first target velocity calculation part" and "second target velocity calculation part" correspond to, for example, a first target velocity computing part 22 and a second target velocity computing part 23, respectively. In the following descriptions, the velocity control part 21 serves also as "road profile evaluating part". However, the road profile evaluating part may be provided outside the velocity control part 21. The final target velocity computing part 24 serves also as "acceleration/deceleration limiting part". However, the acceleration/deceleration limiting part may be provided outside the final target velocity compute part 24.

First, a configuration of an on-board terminal 10 and processings thereby will be explained.

The on-board terminal 10 may be composed of a computer system which includes: an arithmetic device, such as CPU; a memory, such as RAM and ROM; an external storage, such as a hard disk; an input device including switches; a display unit, such as LCD display. Various functional parts, which will be described below, are implemented by execution of certain programs by the CPU. In addition, in order to detect a current position, the on-board terminal 10 also includes a vehicle velocity sensor, a gyroscopic sensor and a GPS (Global Positioning System) receiver.

The on-board terminal 10 includes a vehicle position detecting part 1, a map information acquisition part 2, a road information acquisition part 3 and an information notifying part 4. For each functional part, processing is repeatedly implemented at a predetermined interval by computer programs.

The vehicle position detecting part 1 detects a position of its own vehicle on which the vehicle position detecting part 1 is mounted (hereinafter, simply referred to as "vehicle position"), by a technique using satellites, such GPS, or by communication with an infrastructure or the like.

The map information acquisition part 2 has a map DB. However, a memory unit that stores map information may be separately provided from the map information acquisition part 2. Examples of storage medium for such a purpose include computer-readable CD-ROM, DVD-ROM and hard disk. Moreover, the map data may be mounted on a vehicle as a data base stored in the above-mentioned storage medium, or may be obtained from an information center by communication.

The road information acquisition part 3 acquires road information around the vehicle, based on a vehicle position signal detected by the vehicle position detecting part 1 and map information acquired by the map information acquisition part 2, and outputs the acquired road information to a speed controller 20 using a communication means, such as in-vehicle LAN (Local Area Network).

The information notifying part 4 notifies various pieces of information, such as a current running/control mode, a route guidance around the vehicle, a vehicle velocity at a curve, an in-advance notice of deceleration and the like, by voice message through a speaker or screen image on a display, in such a manner that a driver can easily understand the information.

It should be noted that the on-board terminal 10 may be a navigator mounted on a vehicle that has a route search function or a route guide function. For example, it may be a car navigation system that notifies a route to a destination to driver/passenger.

A road profile obtaining part 40 detects objects installed along a road, and obtains a road profile. For example, the road profile can be obtained by recognizing white lines on the road with an imaging device, such as a camera, or by recognizing roadside walls or guardrails with a radar device. In addition, the road profile obtaining part 40 outputs information of the obtained road profile to the speed controller 20 using a communication means, such as in-vehicle LAN (Local Area Network).

Next, a configuration of the speed controller 20 and processing thereby will be explained.

The speed controller 20 includes a velocity control part 21, a first target velocity computing part 22, a second target velocity computing part 23, a final target velocity computing part 24, a drive axis request torque computing part 25, a transmission control part 26, an engine control part 27 and a brake control part 28. For each functional part, processing is repeatedly implemented at a predetermined interval by computer programs.

The first target velocity computing part 22 computes a first target velocity based on the road information obtained by the road information acquisition part 3. For example, a target velocity is basically set to a speed limit of the road on which the vehicle is running, and when a curved track is detected ahead, a target velocity that is required for the vehicle to safely pass the curved track is computed. In this case, it is desirable that a range for which the first target velocity is computed based on the obtained road information be a distance required for deceleration from a current velocity to zero (halting the vehicle) when the vehicle is decelerated at a specific rate. For example, if a deceleration rate is set so as not to make a driver feel protracted, a distance to safely halt the vehicle can be computed within the range. Further, the range for which a target velocity is computed may be determined based on a capacity of the ROM (Read Only Memory) of the computer. In other words, the range may be determined under conditions where an available amount of the ROM capacity is set small, or a computing period of time by the computer is set short, and the vehicle is safely halted.

The second target velocity computing part 23 computes a second target velocity based on the road profile obtained by the road profile obtaining part 40. For example, when the road ahead is judged to be a curved track based on a result of lane recognition by a camera, a target velocity is computed that allows the vehicle to safely pass the curved track. For implementing image recognition using a camera, it is desirable to perform recognition processing within a range where accuracy is maintained, since accuracy of information of a point well ahead of the vehicle (hereinafter, frequently referred to as "distant road point") is low due to limitation in resolution.

The velocity control part 21 receives the first target velocity computed by the first target velocity computing part 22 and the second target velocity computed by the second target velocity computing part 23, computes a final target velocity by the final target velocity computing part 24, and computes a drive axis request torque by the drive axis request torque computing part 25. Basically, the final target velocity computing part 24 compares the first target velocity and the second target velocity and selects a lower target velocity as a final target velocity. However, the final target velocity may be determined based on information including information of a set vehicle velocity 50, which is set by a driver from an input device (not shown). The drive axis request torque computing part 25 also computes a target gear position TGP, a target engine torque TTENG and a target braking pressure TPBRK, for controlling the vehicle velocity to the final target velocity, and instructs the transmission control part 26, the engine control part 27 and the brake control part 28. The transmission, the engine and the brake are controlled by the transmission control part 26, the engine control part 27 and the brake control part 28, respectively.

The velocity control part 21 implements switching of driving modes. In the present embodiment, there are two modes: a first driving mode and a second driving mode. In the first driving mode, the target gear position TGP, the target engine torque TTENG and the target braking pressure TPBRK are computed so as to control the vehicle velocity in accordance with the above-mentioned final target velocity. In the second driving mode, the target gear position TGP, the target engine torque TTENG and the target braking pressure TPBRK are computed so as to control the vehicle velocity in accordance with an accelerator pedal press amount and a brake pedal stepping force given by the driver. The velocity control part 21 implements the switching between the first driving mode and the second driving mode, in accordance with a signal from a mode selection switch 60 operated by the driver. Specifically, by allowing the driver to operate a touch panel of the on-board terminal 10, such as a car navigation system, or to operate the mode selection switch 60 around the driver's seat, the driving mode can be switched at a timing intended by the driver, and operability is improved.

Next, processings by the road information acquisition part 3 will be described.

Figure 2:
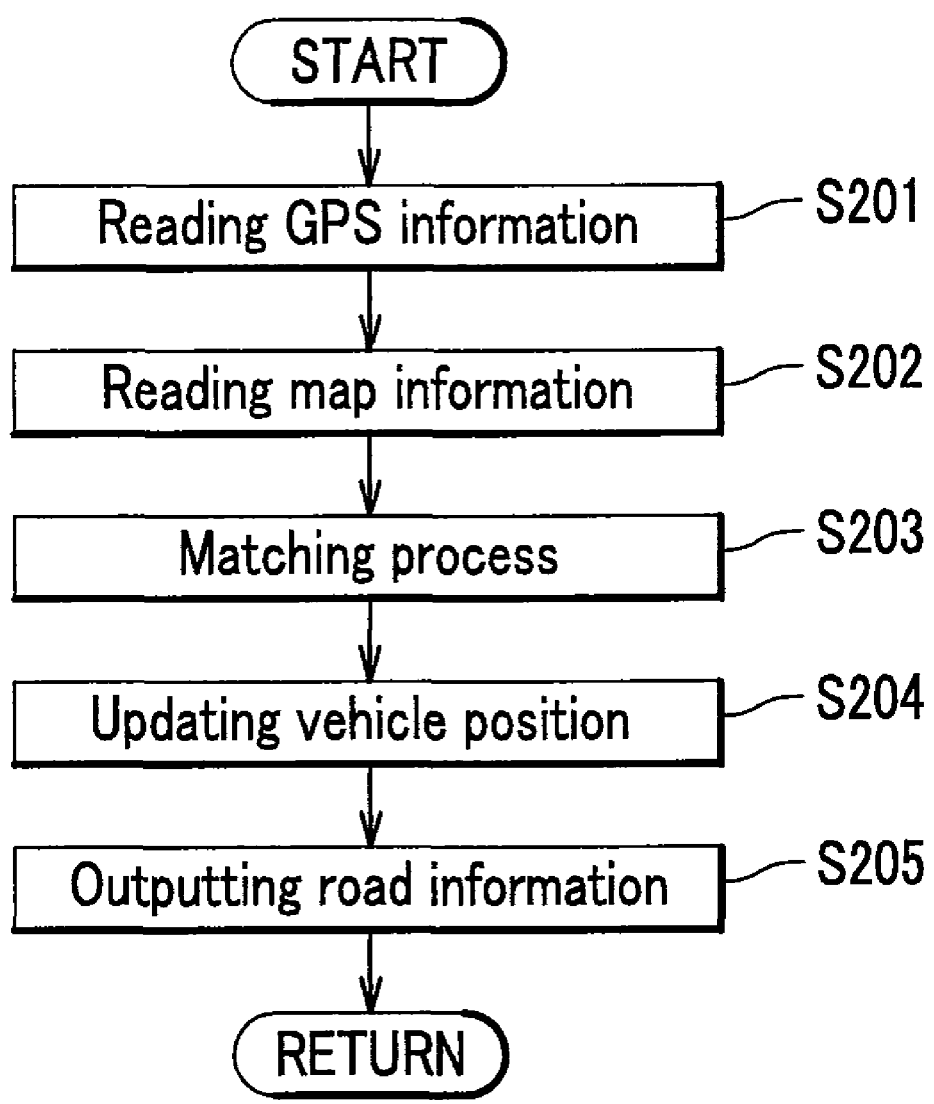
FIG. 2 is a flow chart showing processings of a road information acquisition part 3.

FIG. 2 is a flow chart showing processings of the road information acquisition part 3.

First, the road information acquisition part 3 reads vehicle position information (latitude, longitude or the like) sent from the GPS received by the vehicle position detecting part 1 (S201) Next, the map information acquisition part 2 reads map DB information stored in a memory, such as CD-ROM, DVD-ROM and hard disk (S202).

Next, the road information acquisition part 3 implements a matching process in which a vehicle position is matched on the map DB read at S202, using the vehicle position information read at S201 (S203). A typical example of matching process is a map matching process in which: a mesh (grid) is superposed on a map; the vehicle position (latitude and longitude) and grid points of the mesh on the map are compared; and the vehicle position is matched with the grid point which is the closest from the vehicle position.

The road information acquisition part 3 updates the vehicle position based on the result of the matching process at S203 (S204). The vehicle position information may be parameters that show the above-mentioned latitude and longitude, or may be area information, such as parameters showing a distance from a road fork to the vehicle position.

Next, the road information acquisition part 3 reads road information around the vehicle position updated at S204 (e.g., a curvature radius of a curve and a distance to an entrance of the curve) again from the map DB, and outputs the information to a communication part, such as in-vehicle LAN (S205).

As described above, the road information acquisition part 3 acquires or estimates the vehicle position based on the map information, and outputs the road information.

Next, description will be made with respect to a case where an imaging device, such as a camera, is used in the road profile obtaining part 40.

Figure 3:
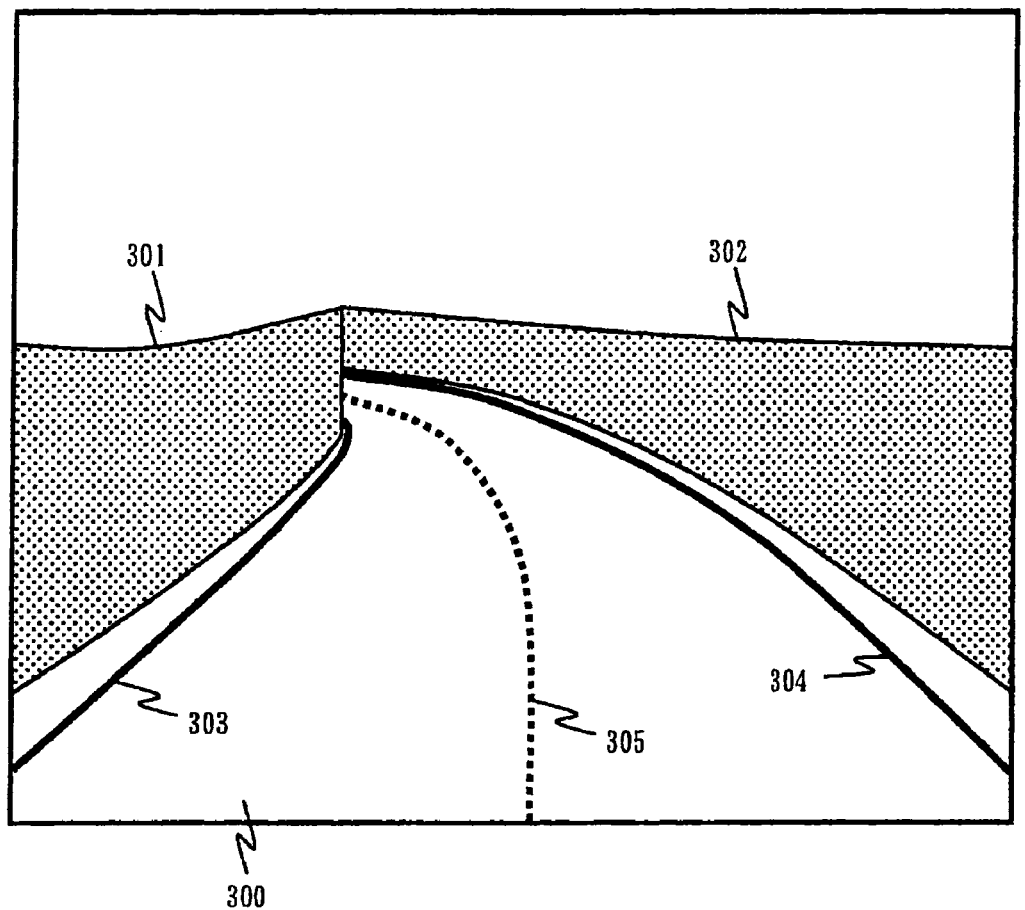
FIG. 3 illustrates an image taken by a camera.

FIG. 3 illustrates an image taken by a camera, when the vehicle approaches a curved track.

In FIG. 3, the vehicle is running on a road 300 which is flanked by walls 301 and 302. First, the road profile obtaining part 40 recognizes shapes of white lines 303 and 304 of the road 300, and computes a center line 305 of the road 300. Next, on the computed center line 305, points are allocated at a specific interval, and curvature radiuses for the respective points are sequentially computed. The computed curvature radius of the curve, distance information and the like are output to a communication part, such as in-vehicle LAN. It should be noted that any conventional methods can be used for obtaining the curvature radius of the curve from traffic lanes.

As described above, by using the road profile obtaining part 40, the road profile is obtained and the road profile information can be output.

Next, with referring to FIG. 4, a control method under a first driving mode will be described.

Figure 4:
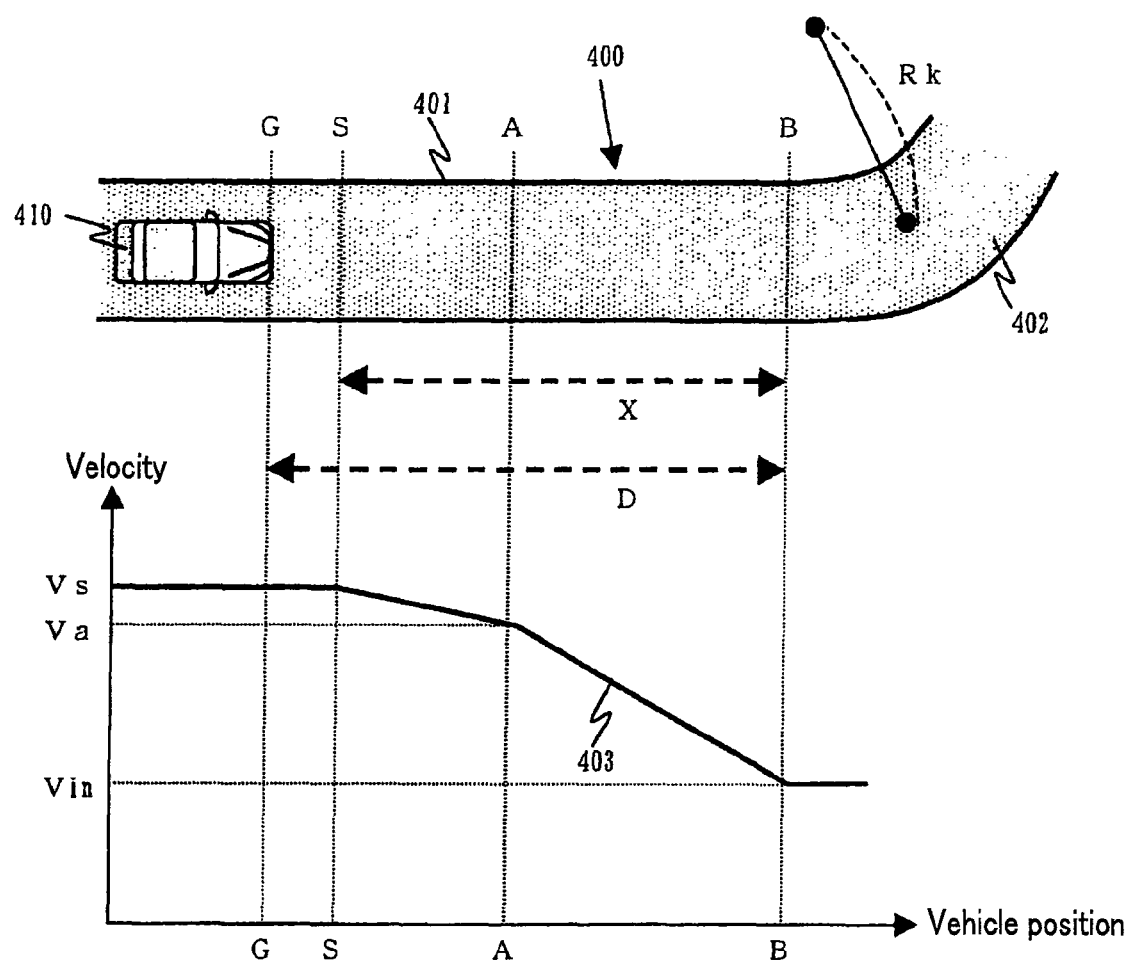
FIG. 4 shows a diagram of a road condition ahead of a vehicle and a graph showing a control transition in a case where the vehicle is decelerated in advance in accordance with curvature radius information of a curve.

FIG. 4 shows a diagram of a road condition ahead of a vehicle and a graph showing a control transition in a case where the vehicle is decelerated in advance in accordance with curvature radius information of a curve obtained by the road information acquisition part 3 or the road profile obtaining part 40.

In FIG. 4, a vehicle 410 is running on a road 400 composed of a straight track 401 and a curved track 402.

First, at a point G in the drawing, the curved track 402 ahead is detected, and the speed controller 20 computes a vehicle-to-curve distance D (distance between the position of the vehicle and an entrance of the curved track 402 indicated with a point B in the drawing). When the curved track 402 ahead is detected, the speed controller 20 also computes a target velocity Vin for entering the curve in accordance with a curvature radius Rk, and based on the computed target velocity Vin, computes a deceleration distance X (a distance required for decelerating from a current vehicle velocity or a velocity set based on the straight track 401 to a velocity for entering the curve).

It should be noted that the speed controller 20 stores a table prepared in advance, in which values of the curvature radius Rk and values of the target velocity Vin for entering the curve are correlated with each other. The speed controller 20 utilizes this table for obtaining the target velocity Vin for entering the curve, in accordance with the value of the curvature radius Rk. Various tables may be stored that are associated with weather, temperature, humidity and the like. In this case, weather, temperature or humidity are obtained in advance, and when the target velocity Vin is determined, a corresponding table for weather, temperature or humidity is extracted, and the target velocity Vin corresponding to the curvature radius Rk is obtained from the extracted table.

When the vehicle 410 passed a point S in the drawing (velocity: Vs) where the vehicle-to-curve distance D becomes equal to the deceleration distance X, as shown in a solid line 403 in the drawing, deceleration of the vehicle is initiated based on the target velocity computed by the speed controller 20. It should be noted that, in the deceleration before entering the curve, it is desirable to implement two-step deceleration to reduce driver's discomfort, as disclosed in Japanese unexamined patent publication No. 2004-142686. In the case of FIG. 4, the vehicle is decelerated at a specific deceleration rate A1 to a point A (velocity: Va), and then decelerated at a specific deceleration rate A2 from the point A to the point B (velocity: Vin).

After the point B where the vehicle 410 is decelerated to the target velocity Vin for entering the curve, the velocity is maintained constant at the target velocity Vin through the curved track 402.

As described above, by detecting a curve with the road information acquisition part 3 or the road profile obtaining part 40, and by decelerating the vehicle 410 to an appropriate velocity before the curve by the speed controller 20, comfortability, usability and stability are improved.

Next, the first target velocity and the second target velocity are described in detail.

Figure 5:
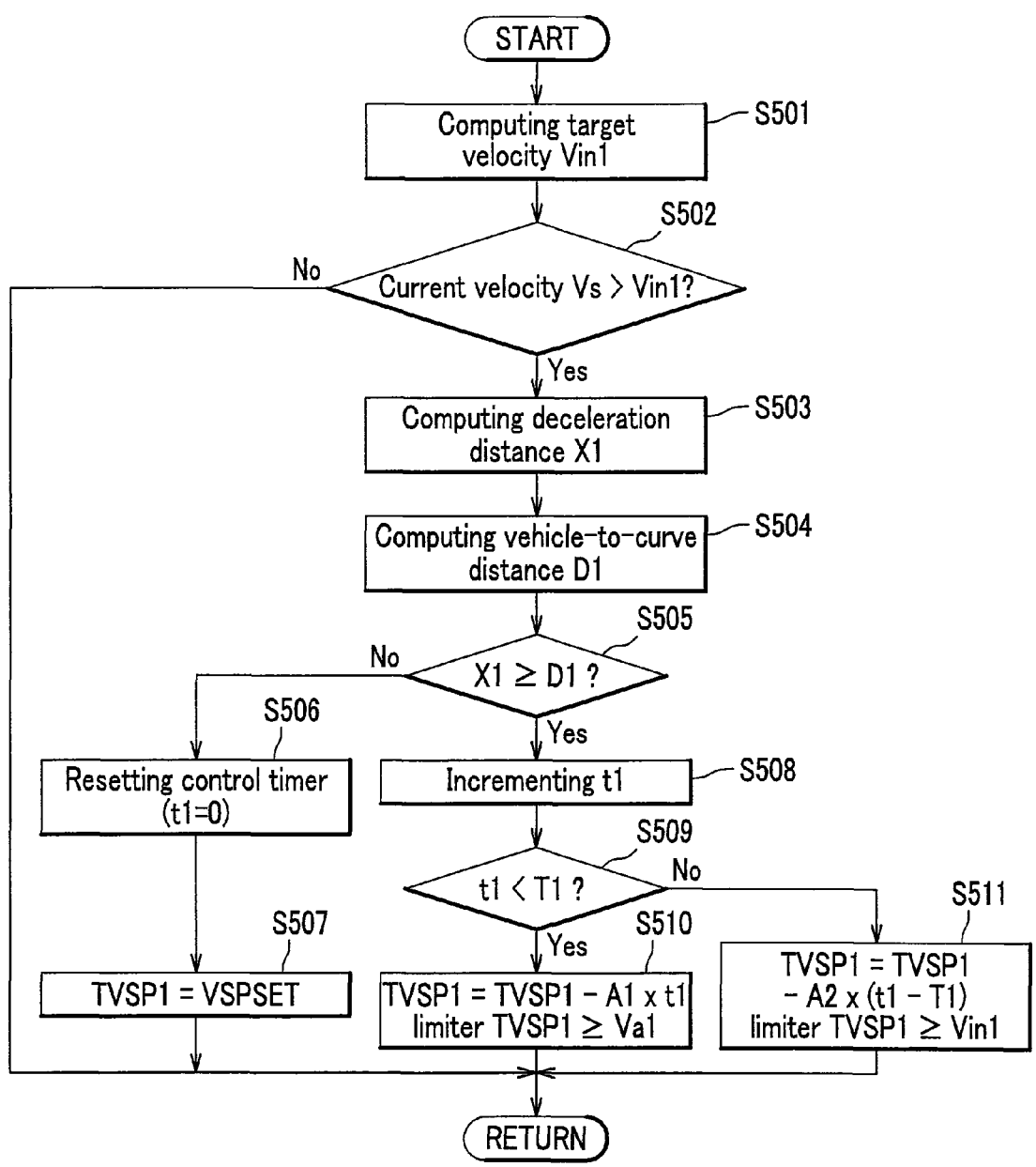
FIG. 5 is a flow chart showing processings of a first target velocity computing part 22 when a vehicle enters a curve.

FIG. 5 is a flow chart showing processings of the first target velocity computing part 22, when the vehicle enters a curve.

First, the first target velocity computing part 22 computes a target velocity Vin1 for entering the curve (S501).

Next, the first target velocity computing part 22 determines whether or not the current velocity Vs is larger than Vin1

(S502). When the current velocity Vs is not larger than Vin1 (No at S502), no deceleration is required, and thus the processing is terminated.

On the other hand, when the current velocity Vs is larger than Vin1 (Yes at S502), the first target velocity computing part 22 computes a deceleration distance X1 based on the velocity Vs and the target velocity Vin1 for entering the curve (S503). The deceleration distance X1 is a distance required for deceleration from the vehicle velocity Vs to the target velocity Vin1 for entering the curve, when the vehicle decelerates at a specific rate. The deceleration distance X1 is calculated from an equation (1).

$$X1=1/2 \times A1 \times T1^2 + Vs \times T1 + (Va1^2 - Vin1^2)/(2 \times A2) \quad (1)$$

Herein, A1 is a deceleration rate with which an initial engine brake is taken into account, and A2 is a deceleration rate with which a foot brake is taken into account. T1 is a duration time for the deceleration rate A1, which is desirably set while a time required for shifting an accelerator pedal to a brake pedal by the driver is taken into account. Vs is a velocity at a deceleration initiation, and Va1 is a velocity when the initial deceleration is terminated. The velocity Va1 is represented by an equation (2) using the deceleration rate A1 and the time T1.

$$Va1 = Vs - A1 \times T1 \quad (2)$$

After S503, the first target velocity computing part 22 computes a vehicle-to-curve distance D1 (S504). The vehicle-to-curve distance D1 is a distance from the vehicle position to an entrance of the curve, obtained based on a signal from a GPS receiver and the map DB, and computed in accordance with the vehicle position obtained based on the signal from the GPS receiver and the map DB.

After S504, the first target velocity computing part 22 compares the deceleration distance X1 and the vehicle-to-curve distance D1, and determines whether or not the vehicle reaches a deceleration initiation point (S505).

When the deceleration distance X1 is shorter than the vehicle-to-curve distance D1 and it is determined that the vehicle does not reach the deceleration initiation point (No at S505), the first target velocity computing part 22 resets a time t1 of a control timer (t1=0) (S506). Herein, t1 is a time period counted by the control timer. Then, a set vehicle velocity VSPSET (target velocity set by the driver through switch operation or the like) is substituted for the target velocity TVSP1 (S507), and the processing is terminated.

When the deceleration distance X1 is equal to or longer than the vehicle-to-curve distance D1, and it is determined that the vehicle reached the deceleration initiation point (Yes at S505), the first target velocity computing part 22 increments the time t1 (S508). When the time t1 is shorter than the time T1 (Yes at S509), the first target velocity computing part 22 computes the target velocity TVSP1 using a deceleration rate with which an engine brake is taken into account (S510), and the processing is terminated. At S510, the target velocity TVSP1 is computed using an equation (3), with the proviso that the lower limit of the target velocity TVSP1 is limited to a velocity Va1 which is a velocity at the termination of the initial deceleration.

$$TVSP1(n) = TVSP1(n-1) - A1 \times t1 \quad (3)$$

On the other hand, when the time t1 is equal to or longer than the time T1 (No at S509), the first target velocity computing part 22 computes the target velocity TVSP1 using a deceleration rate with which a foot brake is taken into account (S511), and the processing is terminated. At S511, the target velocity TVSP1 is computed using an equation (4), with the proviso that the lower limit of the target velocity TVSP1 is limited to a target velocity Vin1 for entering the curve.

$$TVSP1(n) = TVSP1(n-1) - A2 \times (t1 - T1) \quad (4)$$

As described above, by the processing shown in FIG. 5, it becomes possible to set a target velocity for entering the curve in accordance with the map information.

Figure 6:
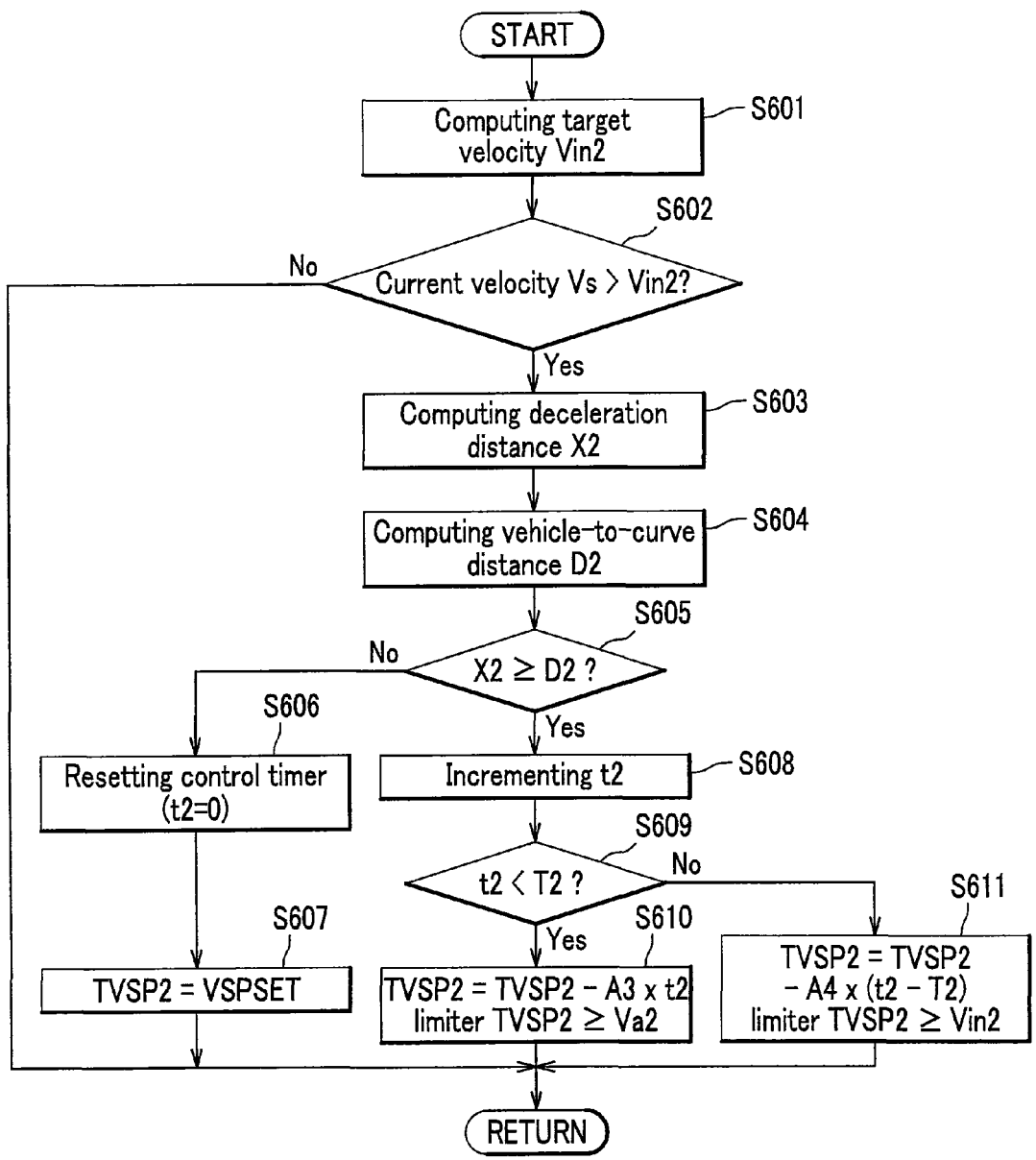
FIG. 6 is a flow chart showing processings of a second target velocity computing part 23 when a vehicle enters a curve.

FIG. 6 is a flow chart showing processings of the second target velocity computing part 23, when the vehicle enters a curve.

First, the second target velocity computing part 23 computes a target velocity Vin2 for entering the curve (S601).

Next, the second target velocity computing part 23 determines whether or not the current velocity Vs is larger than Vin2 (S602). When the current velocity Vs is not larger than Vin2 (No at S602), no deceleration is required, and thus the processing is terminated.

On the other hand, when the current velocity Vs is larger than Vin2 (Yes at S602), the second target velocity computing part 23 computes a deceleration distance X2 based on the velocity Vs and the target velocity Vin2 for entering the curve (S603). The deceleration distance X2 is a distance required for deceleration from the vehicle velocity Vs to the target velocity Vin2 for entering the curve, when the vehicle decelerates at a specific rate. The deceleration distance X2 is calculated from an equation (5).

$$X2 = 1/2 \times A3 \times T2^2 + Vs \times T2 + (Va2^2 - Vin2^2)/(2 \times A4) \quad (5)$$

Herein, A3 is a deceleration rate with which an initial engine brake is taken into account, and A4 is a deceleration rate with which a foot brake is taken into account. T2 is a duration time for a deceleration rate A3, which is desirably set while a time required for shifting an accelerator pedal to a brake pedal by the driver is taken into account. Vs is a velocity at a deceleration initiation, and Va2 is a velocity when the initial deceleration is terminated. The velocity Va2 is represented by an equation (6) using the deceleration rate A3 and the time T2.

$$Va2 = Vs - A3 \times T2 \quad (6)$$

After S602, the second target velocity computing part 23 computes a vehicle-to-curve distance D2 (S604). The vehicle-to-curve distance D2 is a distance from the vehicle position to an entrance of the curve, obtained from an image taken by a camera.

After S604, the second target velocity computing part 23 compares the deceleration distance X2 and the vehicle-to-curve distance D2, and determines whether or not the vehicle reaches the deceleration initiation point (S605).

When the deceleration distance X2 is shorter than the vehicle-to-curve distance D2 and it is determined that the vehicle does not reach the deceleration initiation point (No at S605), the second target velocity computing part 23 resets a time t2 of a control timer (t2=0) (S606). Herein, t2 is a time period counted by the control timer. Then, a set vehicle velocity VSPSET (target velocity set by the driver through switch operation or the like) is substituted for the target velocity TVSP2 (S607), and the processing is terminated.

When the deceleration distance X2 is equal to or longer than the vehicle-to-curve distance D2, and it is determined that the vehicle reached the deceleration initiation point (Yes at S605), the second target velocity computing part 23 increments the time t2 (S608). When the time t2 is shorter than the time T2 (Yes at S609), the second target velocity computing part 23 computes the target velocity TVSP2 using a deceleration rate with which an engine brake is taken into account (S610), and the processing is terminated. At S610, the target velocity TVSP2 is computed using an equation (7), with the proviso that the lower limit of the target velocity TVSP2 is limited to a velocity Va2 which is a velocity at the termination of the initial deceleration.

$$TVSP2(n)=TVSP2(n-1)-A3 \times t2 \qquad (7)$$

On the other hand, when the time t2 is equal to or longer than the time T2 (No at S609), the second target velocity computing part 23 computes a target velocity TVSP2 using a deceleration rate with which a foot brake is taken into account (S611), and the processing is terminated. At S611, the target velocity TVSP2 is computed using an equation (8), with the proviso that the lower limit of the target velocity TVSP2 is limited to a target velocity Vin2 for entering the curve.

$$TVSP2(n)=TVSP2(n-1)-A4 \times (t2-T2) \qquad (8)$$

As described above, by the processing shown in FIG. 6, it becomes possible to set a target velocity for entering the curve in accordance with the road profile.

First Example of Velocity Control

Next, as a first example of velocity control, a method for controlling a vehicle will be explained in which the vehicle velocity is controlled in accordance with the first target velocity computed based on the map information and a second target velocity computed based on the information obtained by a camera.

Figure 7:
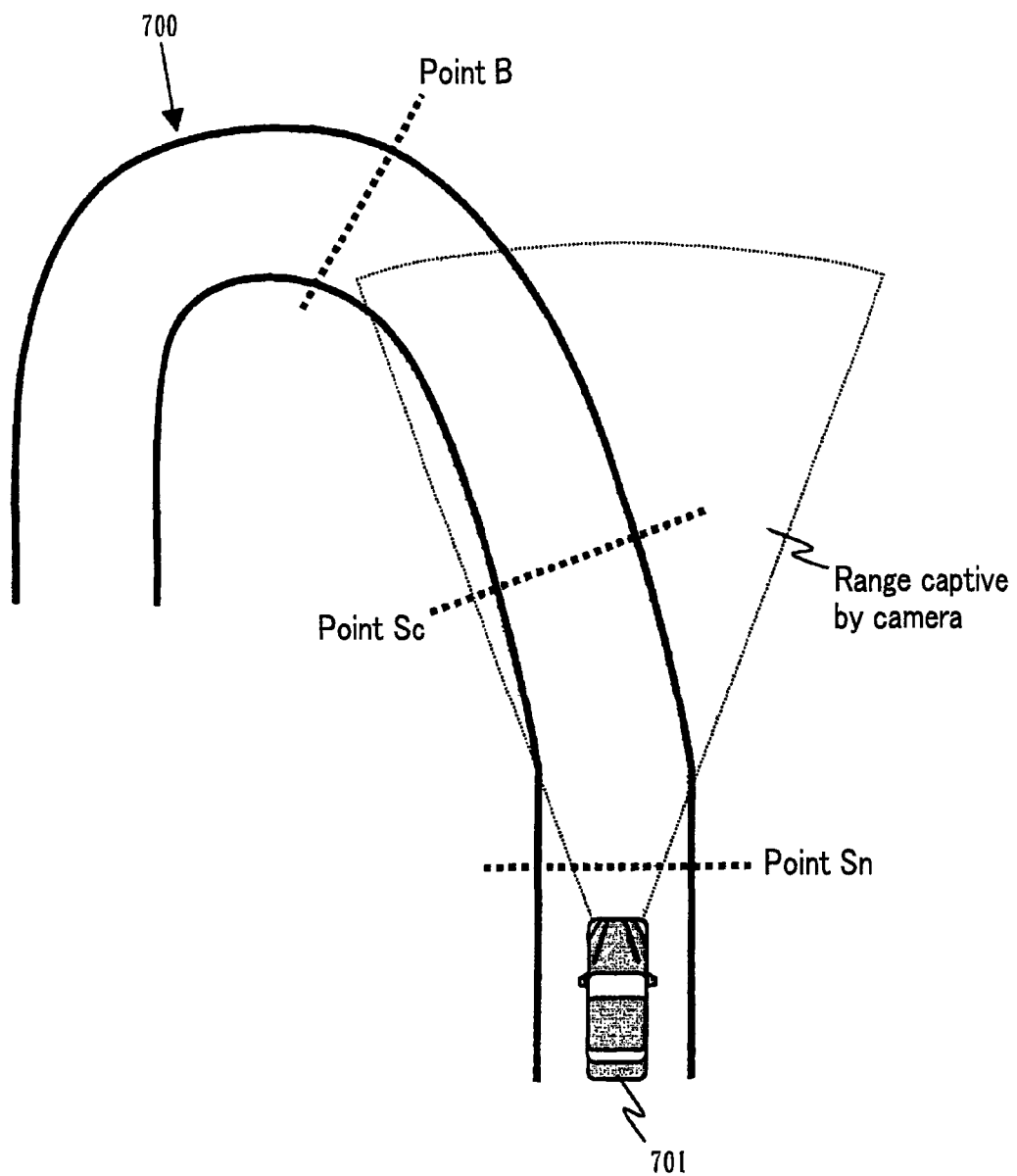
FIG. 7 is a diagram showing a case where a road has a varying curvature radius from a slow curve to a sharp curve.
Figure 8:
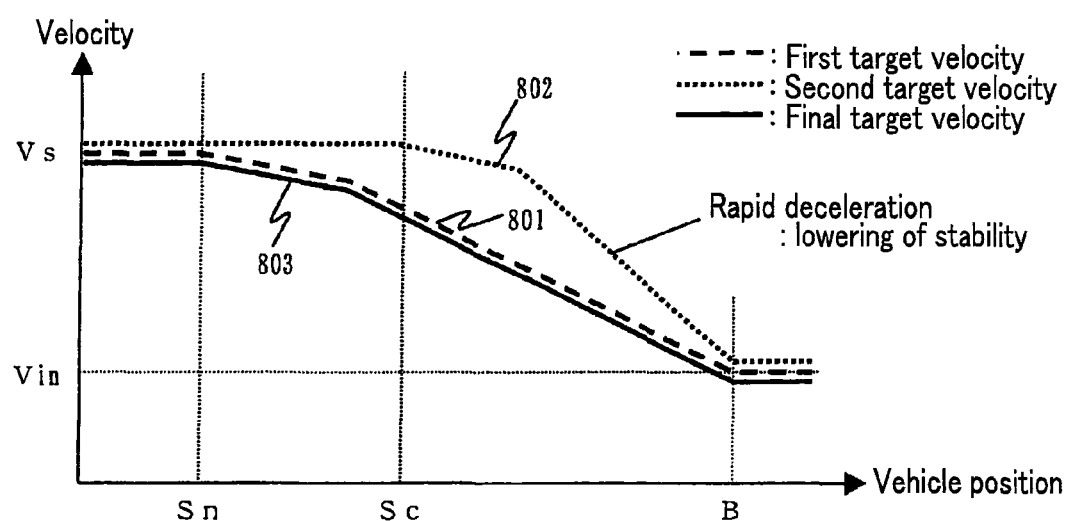
FIG. 8 is a graph showing a control transition on a road having a varying curvature radius from a slow curve to a sharp curve.

FIG. 7 is a diagram showing a case where a road has a varying curvature radius from a slow curve to a sharp curve, and FIG. 8 is a graph showing a control transition of a target velocity on a road having a varying curvature radius.

In FIG. 7, a vehicle 701 is running on a road 700 having a varying curvature radius from a slow curve to a sharp curve.

First, the first target velocity is computed by the first target velocity computing part 22 in such a manner that deceleration of the vehicle starts at a point Sn and is completed at a point B. Herein, the point B is an entrance point of the sharp curve. The point Sn is a deceleration initiation point. Between the point Sn and the sharp curve entrance point B, the vehicle is decelerated to such a velocity that the vehicle stably runs along the sharp curve without giving discomfort to the driver. In FIG. 8, the first target velocity is indicated with a dashed line 801.

Since a sharp curve at a distant road point cannot be detected at the point Sn due to limitation in a range captive by the camera, the second target velocity computing part 23 does not compute, at the point Sn, the second target velocity that requires deceleration (for a slow curve closer to the vehicle, it is determined that deceleration is not required). When the sharp curve is eventually detected at the point Sc, the second target velocity is computed so that deceleration starts at the point Sc and is completed at the point B. As indicated with a dotted line 802 in FIG. 8, the second target velocity includes rapid deceleration, and as compared with the first target velocity (dashed line 801), stability is reduced in the velocity control according to the second target velocity.

In this situation, the final target velocity computing part 24 of the speed controller 20 compares the first target velocity and the second target velocity and selects a lower target velocity as a final target velocity, which is indicated with a solid line 803 in FIG. 8.

As described above, in a case of the road having a varying curvature radius from a slow curve to a sharp curve as shown in FIG. 7, even when a stability cannot be secured with the second target velocity computed based on the image information, it becomes possible to implement stable velocity control by selecting the first target velocity computed based on the map information and decelerating the vehicle in advance.

Second Example of Velocity Control

Next, as a second example of velocity control, a method for controlling a vehicle will be explained in which a first target velocity is switched to the second target velocity, when deceleration control is implemented in accordance with the first target velocity.

Figure 9:
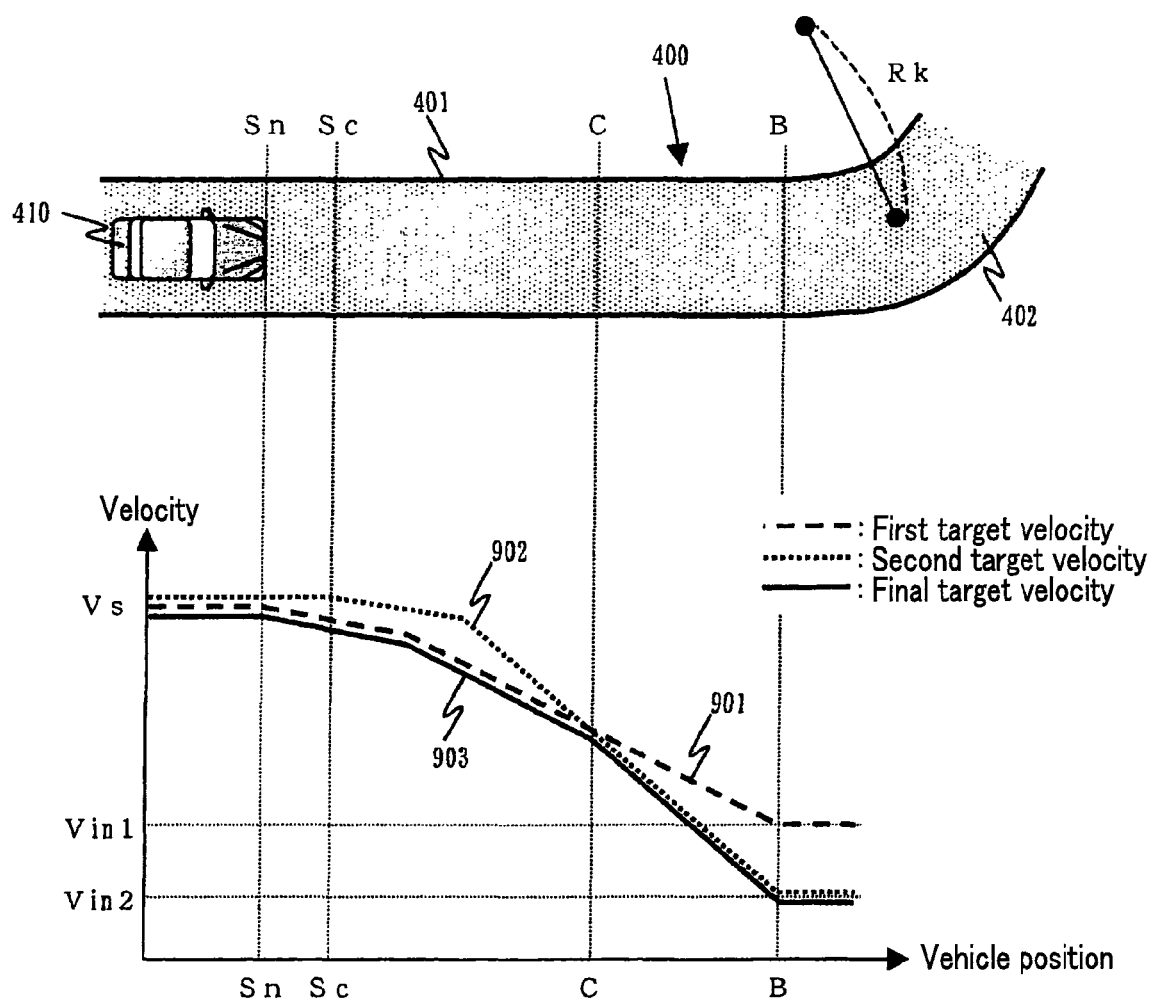
FIG. 9 shows a diagram of a road condition ahead of a vehicle and a graph showing a control transition in a case where switching of a target velocity is implemented during deceleration for a curve.

FIG. 9 shows a diagram of a road condition ahead of a vehicle and a graph showing a control transition of a target velocity.

In FIG. 9, a vehicle 410 is running on a road 400 composed of a straight track 401 and a curved track 402, like in FIG. 4.

First, the first target velocity is computed by the first target velocity computing part 22 in such a manner that deceleration of the vehicle starts at a point Sn and is completed at a point B. Herein, the point B is an entrance point of the sharp curve. Vin1 is a target velocity for entering the curve computed based on the curvature radius information obtained by the road information acquisition part 3. In FIG. 9, the first target velocity is indicated with a dashed line 901.

In a similar manner to a method for computing the first target velocity, the second target velocity is computed by the second target velocity computing part 23 so that deceleration starts at the point Sc and is completed at the point B. Herein, Vin2 is a target velocity for entering the curve computed based on the curvature radius information obtained by the road profile obtaining part 40, with the proviso that Vin2 is smaller than Vin1. In FIG. 9, the second target velocity is indicated with a dotted line 902.

In this situation, the final target velocity computing part 24 of the speed controller 20 compares the first target velocity and the second target velocity and selects a lower target velocity as a final target velocity, which is indicated with a solid line 903 in FIG. 9. At a point C in the drawing, the final target velocity is switched from the first target velocity to the second target velocity.

As described above, a comparison is made between the first target velocity computed based on the map information and the second target velocity computed based on the image information obtained by a camera, a lower target velocity is selected, and the vehicle velocity is controlled in accordance with the selected target velocity. Therefore, it becomes possible to switch from the first target velocity selected for deceleration in advance to the second target velocity for deceleration, when the latter becomes lower. Accordingly, a lower target velocity is selected as the target velocity for entering the curve, and more stable velocity control can be implemented.

In the second example of velocity control illustrated in FIG. 9, the switching from the first target velocity to the second target velocity was described. However, it is also apparent that switching from the second target velocity to the first target velocity can be implemented as well.

In the above description, when the second target velocity is computed based on the image information obtained by a camera, information of a distant road point is also taken into account. However, when the image obtained by a camera is processed, information of a distant road point may not be accurately computed due to limitation in resolution of the camera. Accordingly, computation may be made only on information of close range (e.g., 30 m), within which accuracy is sufficiently maintained.

Third Example of Velocity Control

Next, as a third example of velocity control, a method for controlling a vehicle will be explained in which a camera for obtaining information of only close range is used.

Figure 10:
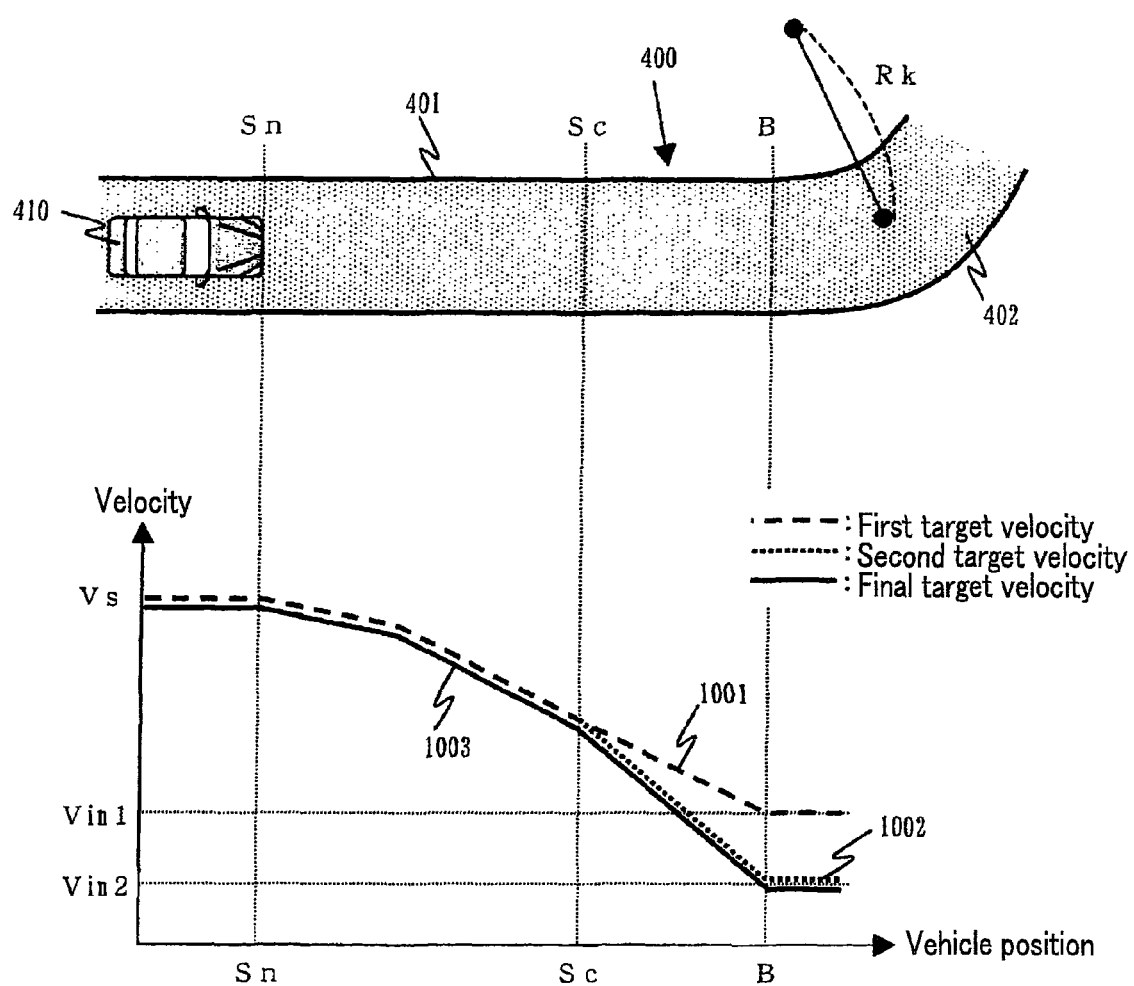
FIG. 10 shows a diagram of a road condition ahead of a vehicle and a graph showing a control transition in a case where switching of a target velocity is implemented during deceleration for a curve, in a system that does not compute a second target velocity at a position well before the curve.

FIG. 10 shows a diagram of road condition ahead of vehicle and a graph showing a control transition of a target velocity.

In FIG. 10, a vehicle 410 is running on a road 400 composed of a straight track 401 and a curved track 402, like in FIGS. 4 and 9.

First, the first target velocity is computed by the first target velocity computing part 22 in such a manner that deceleration of the vehicle starts at a point Sn and is completed at a point B. Herein, the point B is an entrance point of the curve. Vin1 is a target velocity for entering the curve computed based on the curvature radius information obtained by the road information acquisition part 3. In FIG. 10, the first target velocity is indicated with a dashed line 1001.

The second target velocity is computed by the second target velocity computing part 23 using only the information of the close range (e.g., 30 m), and either the second target velocity is not computed up to the point Sc where a location of the entrance of the curved track is determined, or the target velocity for a straight track is output. In the former case, as indicated with a dotted line 1002 in FIG. 10, when the vehicle reached the point Sc, the target velocity Vin2 for entering the curve is computed, and based on the final target velocity at that point and information of Vin2, the second target velocity is computed.

In this situation, the first target velocity and the second target velocity are compared, and if the second target velocity is found out to be lower, the final target velocity computing part 24 of the speed controller 20 selects the second target velocity as a final target velocity, which is indicated with a solid line 1003 in FIG. 10. At a point Sc in the drawing, the final target velocity is switched from the first target velocity to the second target velocity.

As described above, also in a case where the camera that obtains only the information of the close range is used, a comparison is made between the first target velocity computed based on the map information and the second target velocity computed based on the image information obtained by a camera, a lower target velocity is selected, and the vehicle velocity is controlled in accordance with the selected target velocity, as in the second example of velocity control. Therefore, it becomes possible to switch from the first target velocity selected for deceleration in advance to the second target velocity for deceleration, when the latter is computed and found out to be lower. Accordingly, a lower target velocity is selected as the target velocity for entering the curve, and more stable velocity control can be implemented.

In the third example of velocity control, the road profile obtained based on the camera image is limited to the close range. Since information of a point where deceleration or acceleration is required (for example, entrance or exit of a curve, stop line and the like) can be obtained from the map information in advance, the processing of the camera image can be implemented only at that point, and therefore a load on the computing can be reduced.

Fourth Example of Velocity Control

Next, as a fourth example of velocity control, a method for controlling a vehicle will be explained in which the second target velocity based on the information of the image taken by the camera is constantly computed, but the second target velocity based on the image information is utilized as the control information only when the vehicle is within a range that secures accuracy which is ahead of a point where acceleration/deceleration is required, since there is a problem of poor accuracy in computation based on the camera image information at a distant road point, as described in the third example of velocity control.

Figure 11:
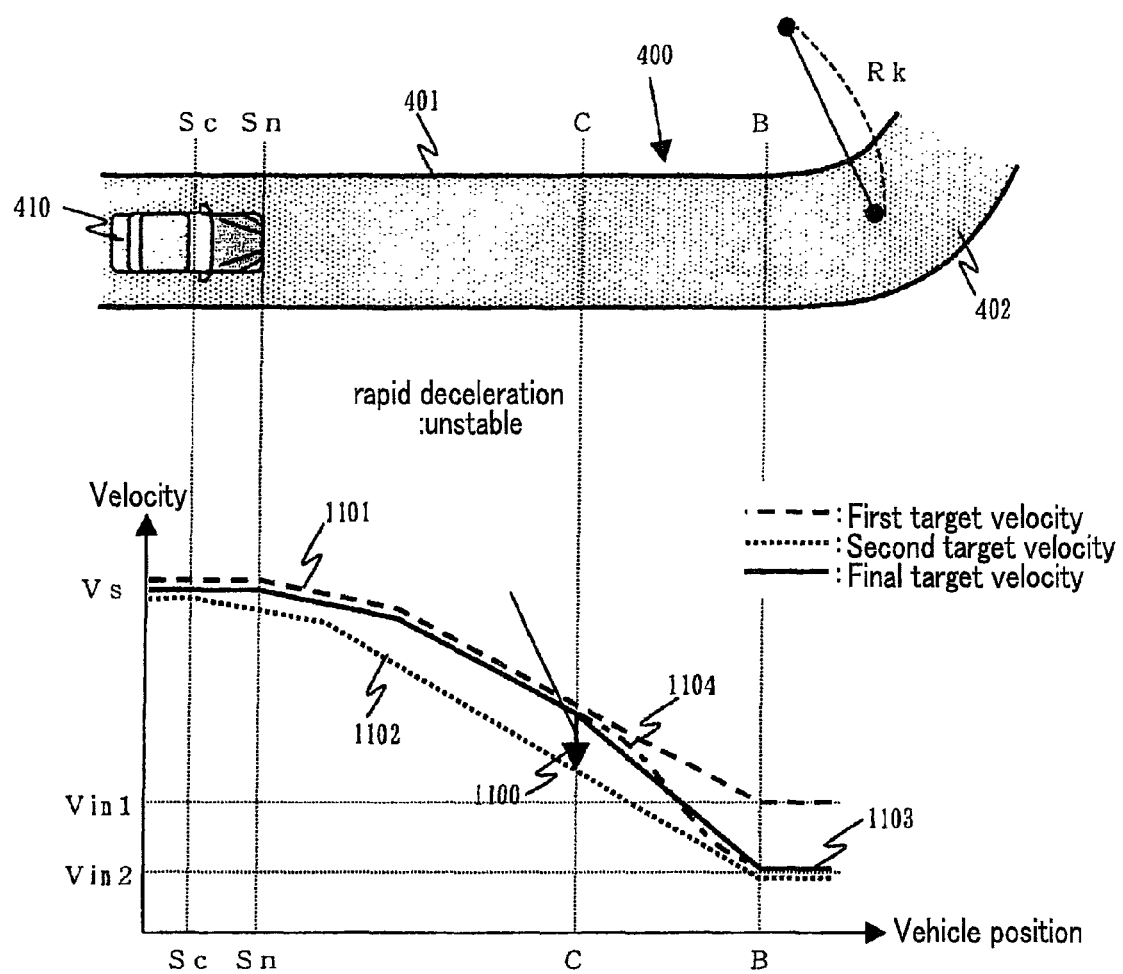
FIG. 11 shows a diagram of a road condition ahead of a vehicle and a graph showing a control transition in a case where switching of a target velocity is implemented while limiting acceleration/deceleration of the vehicle.

FIG. 11 shows a diagram of a road condition ahead of a vehicle and a graph showing a control transition of a target velocity.

In FIG. 11, a vehicle 410 is running on a road 400 composed of a straight track 401 and a curved track 402, like in FIGS. 4, 9 and 10.

First, the first target velocity is computed by the first target velocity computing part 22 in such a manner that deceleration of the vehicle starts at a point Sn and is completed at a point B. Herein, the point B is an entrance point of the curve. Vin1 is a target velocity for entering the curve computed based on the curvature radius information obtained by the road information acquisition part 3. In FIG. 11, the first target velocity is indicated with a dashed line 1101.

In a similar manner to a method for computing the first target velocity, the second target velocity is computed by the second target velocity computing part 23 so that deceleration starts at the point Sc and is completed at the point B. Herein, Vin2 is a target velocity for entering the curve computed based on the curvature radius information obtained by the road profile obtaining part 40, with the proviso that Vin2 is smaller than Vin1. In FIG. 11, the second target velocity is indicated with a dotted line 1102.

As described above, the second target velocity computed based on the camera image information has a problem in securing accuracy of information of a distant road point. At a point C away from the curve entrance point B by a specific distance (for example, 30 m), accuracy of the curve information is sufficiently secured, and therefore, the second target velocity can be used as control information at the point C.

Therefore, when the final target velocity computing part 24 of the speed controller 20 compares the first target velocity and the second target velocity and a lower target velocity is selected as a final target velocity, the final target velocity follows the first target velocity 1101 indicated with the solid line 1103 up to the point C, and switches to the second target velocity 1102 after the point C, since accuracy of the second target velocity becomes high.

If the first target velocity is switched to the second target velocity, and a lower target velocity is simply selected as the final target velocity, the final target velocity stepwise shifts and deceleration suddenly occurs, as shown in a solid arrow 1100 in the graph. This shift gives driver/passenger a feeling of strong deceleration, and thus stability and comfortability are markedly reduced.

Therefore, in the present example of velocity control, when the switching of the target velocity is implemented, the final target velocity is made to follow a pattern 1103 or 1104, to gradually change the target velocity while avoiding a sudden change in the vehicle velocity. In other words, before and after the point C where the first target velocity is switched to the second target velocity, the final target velocity (the pattern 1103 or 1104) is set so that the acceleration/deceleration is maintained in a specific range, and the vehicle velocity is controlled based on the set final target velocity (or pattern). For example, as in the case of the final target velocity indicated with the solid line 1103, after the point C, the vehicle may be decelerated to the target velocity Vin2 for entering the curve computed by the second target velocity computing part 23. In addition, as in the case of the final target velocity indicated with the dashed-dotted line 1104, after the point C, the vehicle may be decelerated to the Vin2, with a deceleration rate being kept within a specific range.

It is desirable that the setting range for acceleration/deceleration in the final target velocity pattern 1103 or 1104 be selected from values defined for a well-known ACC system (adaptive cruise control system). Specifically in Japan, the values are defined by JIS (Japanese Industrial Standards) (JIS No: JIS D 0801), stating "average automatic deceleration rate shall not exceed 3.0 m/s$^2$" and "automatic acceleration rate of ACC system shall not exceed 2.0 m/s$^2$". Therefore, it is desirable in Japan that the acceleration be set within 2.0 m/s$^2$, and the deceleration rate be set within 3.0 m/s$^2$. In this manner, by setting the acceleration/deceleration within the range defined for the well-known system (ACC system), stability is secured and velocity control can be implemented while following the standards.

Since the feeling of acceleration and deceleration may differ depending on drivers, a value of acceleration/deceleration that does not give discomfort to the driver may be arbitrarily set in advance by the driver through a setting part, such as a touch-panel and the like, provided on the on-board terminal 10. Alternatively, instead of the value set by the driver, the value may be set by a learning control that stores acceleration/deceleration data during regular driving and sets a target velocity using the stored data. By setting the acceleration/deceleration in this manner, velocity control that satisfies different drivers can be realized.

As described above, when the switching from the first target velocity to the second target velocity is implemented, by computing the final target velocity pattern 1103 or 1104 that keeps the acceleration/deceleration in a specific range, stability and comfortability can be maintained.

The method for setting a final target velocity has been described, in a case where the first target velocity is switched to the second target velocity, with reference to FIG. 11. However, any method for setting the final target velocity with the acceleration/deceleration kept within the specific range can be used, and thus there may be various patterns.

In the fourth example of velocity control, when the switching of the target velocity is implemented, the vehicle velocity is controlled in such a manner that the acceleration/deceleration is maintained within the specific range. However, the driving force or braking force (torque) of the engine, brake device and the like of the vehicle may be maintained within a specific range, instead of setting the acceleration/deceleration. Alternately, instead of setting acceleration/deceleration, by directly setting target velocity that does not give discomfort to the driver before and after the switching of the target velocity, comfortability can be maintained.

Next, in the present embodiment, a control method in a case where the road information is not properly obtained by the road information acquisition part 3 will be described.

As described above, in the on-board terminal 10 using GPS, such as the navigation system, accuracy may become markedly reduced due to occurrence of multipath or failure in satellite capture. If the road information is output with low accuracy and a first target velocity is computed, running stability and comfortability becomes markedly reduced. In addition, comparison with the second target velocity obtained using the result of the road profile obtaining part 40 becomes difficult. Accordingly, it is preferable not to implement velocity control, when the reliability (accuracy) of the road information obtained by the road information acquisition part 3 is low.

Figure 12:
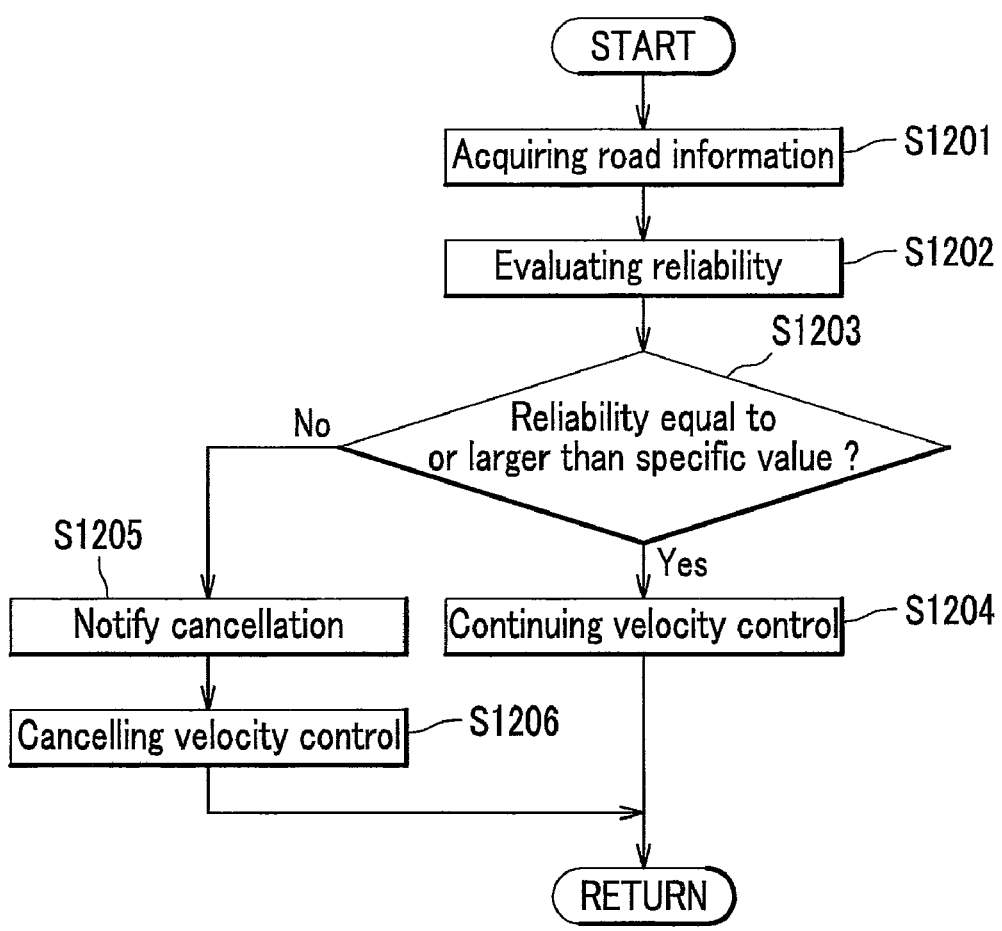
FIG. 12 is a flow chart for determining whether velocity control is canceled or continued, in accordance with reliability of road information.

FIG. 12 is a flow chart showing processings whether velocity control (first driving mode) is canceled or continued, in accordance with reliability (accuracy) of road information obtained by the road information acquisition part 3. This flow is performed at a fixed interval by the velocity control part 21.

First, the velocity control part 21 obtains road information around the vehicle from the road information acquisition part 3 (S1201). Upon obtaining the information, the vehicle position detecting part 1 obtains the number of GPS satellites used for detecting the vehicle position (GPS satellite capture number); and a DOP (Dilution of Precision: positioning accuracy degradation index) showing a degradation of positioning accuracy determined by an arrangement of the GPS satellites. In addition, there is obtained an index showing whether or not the place is susceptible to multipath, as the road information around the vehicle. For example, effect by multipath is large in an area with tall buildings, such as inner-city district, and effect by multipath is small in an area with less shielding objects, such as suburbs.

Next, the velocity control part 21 judges reliability of the road information acquired by the road information acquisition part 3, using the road information obtained at S1201 or the positioning information by the GPS (S1202). Herein, reliability of road information is evaluated with a 5-step scale represented by the numerals from 1 to 5, with "1" being the lowest reliability and "5" being the highest reliability. With respect to the number of GPS satellites, a higher capture number means higher reliability, and with respect to the DOP, smaller value means higher reliability. In addition, smaller effect by multipath means higher reliability. Based on these pieces of information, reliability of the road information is evaluated, and a numeral from 1 to 5 is assigned.

Next, the velocity control part 21 judges whether or not the evaluation result of the reliability obtained at S1202 is equal to or larger than a specific value (S1203) and when the value is the specific value or larger (Yes at S1203), the step proceeds to S1204, and the velocity control (first driving mode) is continued.

On the other hand, when the evaluation result of the reliability is smaller than the specific value (No at S1203), the velocity control part 21 notifies the driver/passenger by voice message or display message that the velocity control will be canceled. Examples of a means for notifying cancellation of control (cancellation notifying part) include a warning beep generated by the on-board terminal 10 and a display message on a display. Subsequently, the velocity control is canceled (S1206), and the driving mode is switched to the second driving mode in which the vehicle velocity is manually controlled by the driver. In this case, if the vehicle is accelerated or decelerated, in the first place, the velocity is controlled so as to avoid sudden change in a transition of acceleration/deceleration, and then the velocity control is canceled. Specifically, when the vehicle is accelerated, the target engine torque TTENG is made gradually small; when the vehicle is decelerated, the target braking pressure TPBRK is made gradually small.

As described above, when the reliability (accuracy) of the road information obtained by the road information acquisition part 3 is low, by cancelling the velocity control, erroneous velocity control is prevented, and thus running stability is improved. In addition, when the velocity control will be canceled, the cancellation is notified to the driver/passenger in advance, and thus secure feeling of the driver/passenger is improved. Further, if the vehicle is accelerated or decelerated upon the cancellation of the velocity control, the velocity is controlled so as to avoid sudden change in a transition of acceleration/deceleration. As a result, unexpectedness upon the velocity control that the driver/passenger may have can be reduced, and feeling of security and running stability can be improved.

Next, in the same system described with reference to FIG. 12, a control method will be described in a case where the velocity control is not applied (i.e., driving mode is in a second driving mode) and reliability (accuracy) of the road information obtained by the road information acquisition part 3 becomes high, and thus the velocity control is resumed (i.e., driving mode is shifted to a first driving mode).

Figure 13:
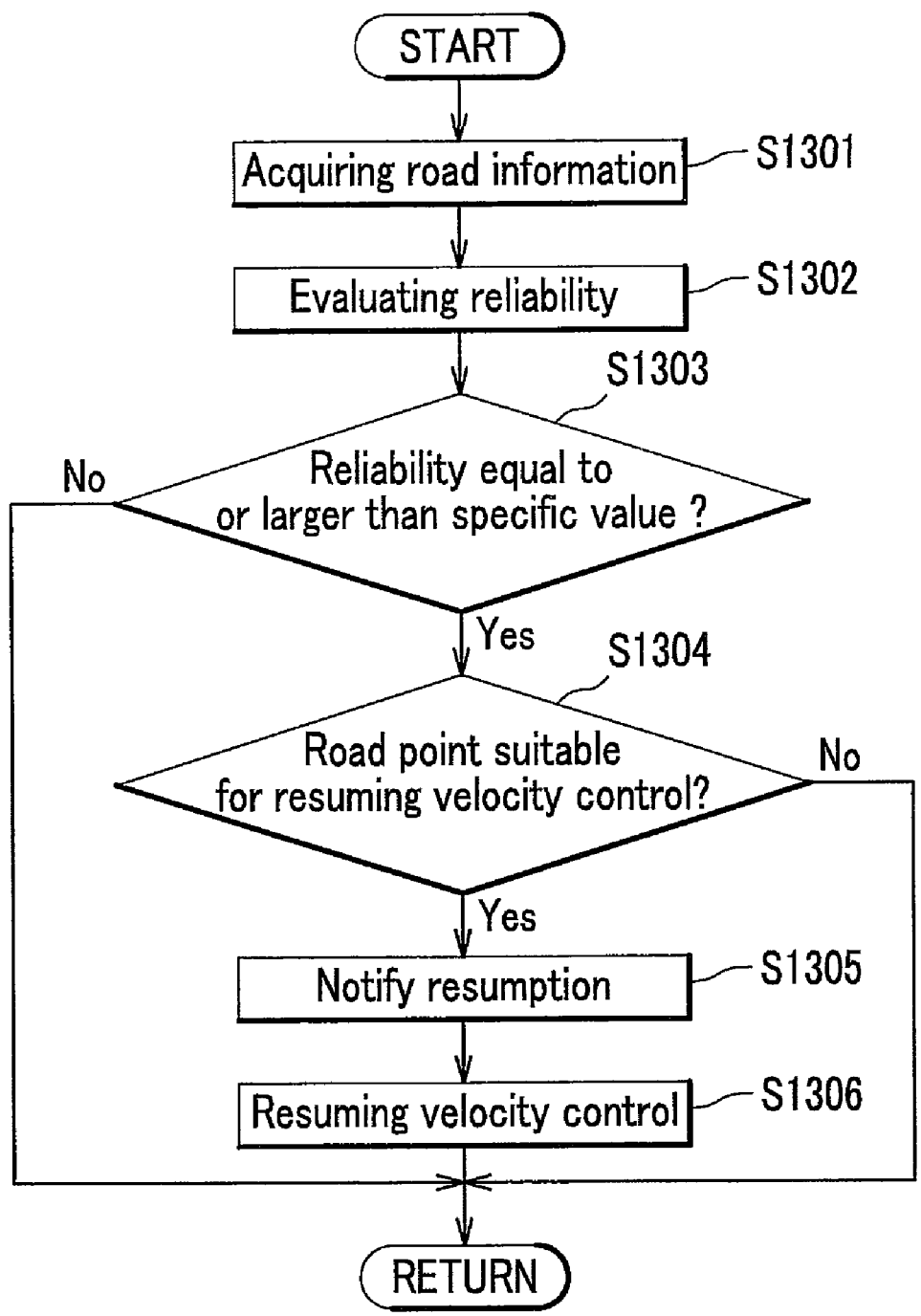
FIG. 13 is a flow chart for determining whether velocity control is resumed or not, in accordance with reliability of road information, when the velocity control is not applied.

FIG. 13 is a flow chart showing processings whether or not velocity control is resumed, in accordance with reliability (accuracy) of road information obtained by the road information acquisition part 3. This flow is performed at a fixed interval by velocity control part 21, when the velocity control is not applied.

Since S1301 and S1302 are substantially the same as S1201 and S1202 in FIG. 12, duplicate descriptions are omitted.

Next, it is judged whether or not the evaluation result of the reliability determined by the velocity control part 21 at S1302 is equal to or larger than a specific value (S1303), and when the value is the specific value or larger (Yes at S1303), the step proceeds to S1304. On the other hand, when the evaluation result of the reliability is smaller, the processing is terminated (return).

At S1304, the velocity control part 21 judges whether or not the road on which the vehicle is running is suitable for the vehicle to resume the velocity control, and if the road is suitable for resuming the velocity control (Yes at S1304), the step proceeds to S1305. On the other hand, if the road is not suitable for resuming the velocity control, the processing is terminated (return). Herein, the judgment on whether or not the road is suitable for resuming the velocity control depends on the profile of the road on which the vehicle is running. Examples of the roads suitable for resuming the velocity control include a slow-curved track having a curvature radius of a specific value or more that leads to a straight track. On the other hand, examples of the roads not suitable for resuming the velocity control include a road point other than the above-mentioned resumable point. The reason is that the driver may feel an unexpected velocity change and stability may be reduced, if the vehicle control is resumed when the vehicle is running along a curved track (i.e., acceleration/deceleration is implemented even though the vehicle is running the curve).

At S1305, the velocity control part 21 notifies the driver/passenger that the velocity control will be resumed. Examples of a means for notifying resumption of control (resumption notifying part) include a warning beep generated by the on-board terminal 10 and a display message on a display.

Subsequently, the velocity control part 21 resumes the velocity control, and switches the second driving mode in which the vehicle velocity is manually controlled by the driver to the first driving mode (S1306), and terminates the process (return).

As described above, in a case where the reliability (accuracy) of the road information obtained by the road information acquisition part 3 becomes high when the velocity control is not applied and thus the velocity control will be resumed, by judging whether or not the road on which the vehicle is running is suitable for resuming velocity control, unstable condition (for example, acceleration/deceleration when running a curve) can be avoided, and thus stability is improved. In addition, the velocity control is resumed automatically, and thus usability is improved at the same time.

Fifth Example of Velocity Control

Next, as a fifth example of velocity control, a method for controlling a vehicle will be explained in which information of a curve entrance point obtained by the road information acquisition part 3 does not match information of a curve entrance point obtained by the road profile obtaining part 40.

Figure 14:
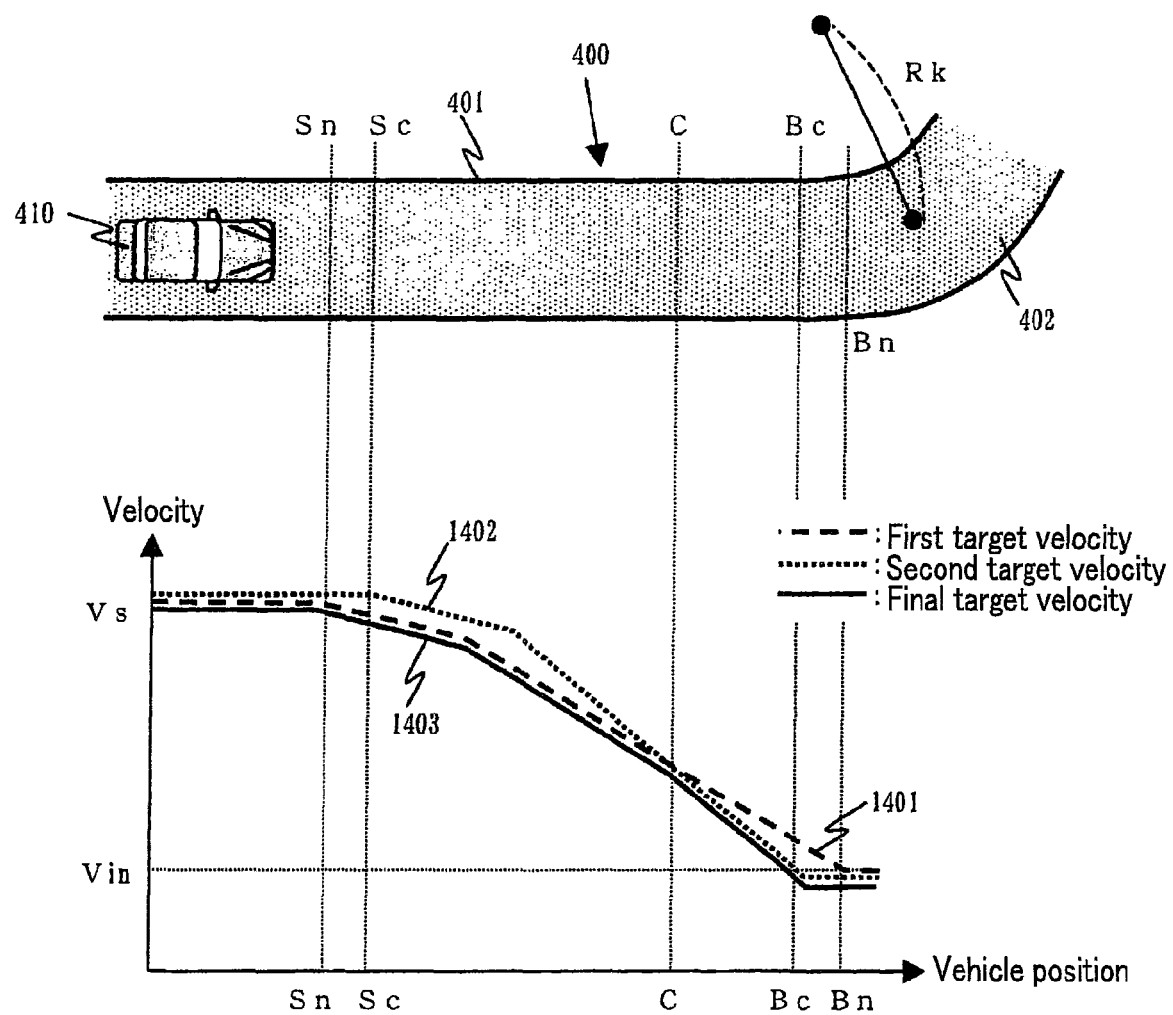
FIG. 14 shows a diagram of a road condition ahead of a vehicle and a graph showing a control transition in a case where switching of a target velocity is implemented when two pieces of information regarding a curve entrance point are different.

FIG. 14 shows a diagram of a road condition ahead of a vehicle and a graph showing a control transition of a target velocity.

In FIG. 14, a vehicle 410 is running on a road 400 composed of a straight track 401 and a curved track 402, like in FIGS. 4, 9, 10 and 11.

First, the first target velocity is computed by the first target velocity computing part 22 in such a manner that deceleration of the vehicle starts at a point Sn and is completed at a point Bn. Herein, the point Bn is an entrance point of the curve obtained by the road information acquisition part 3. In FIG. 14, the first target velocity is indicated with a dashed line 1401.

In a similar manner to a method for computing the first target velocity, the second target velocity is computed by the second target velocity computing part 23 so that deceleration starts at the point Sc and is completed at a point Bc. Herein, the point Bc is an entrance point of a curve obtained by the road profile obtaining part 40, and a distance from the vehicle to the point Bc is shorter than a distance from the vehicle to the point Bn. In FIG. 14, the second target velocity is indicated with a dotted line 1402.

In this situation, the final target velocity computing part 24 of the speed controller 20 compares the first target velocity and the second target velocity and selects a lower target velocity as a final target velocity, which is indicated with a solid line 1403 in FIG. 14. At a point C in the drawing, the final target velocity is switched from the first target velocity to the second target velocity.

As described above, even though the information of the curve entrance point obtained by the road information acquisition part 3 is different from the information of the curve entrance point obtained by the road profile obtaining part 40, it becomes possible to switch from the first target velocity selected for deceleration in advance to the second target velocity for deceleration, when the latter becomes lower. Accordingly, a lower target velocity is selected as the target velocity for entering the curve, and more stable velocity control can be implemented.

In the fifth example of velocity control illustrated in FIG. 14, the switching from the first target velocity to the second target velocity was described. However, it is also apparent that switching from the second target velocity to the first target velocity can be implemented as well.

It should be noted that the second to fourth examples of velocity control can be implemented in the similar manner to the fifth example of velocity control, when the information of the curve entrance point obtained by the road information acquisition part 3 is different from the information of the curve entrance point obtained by the road profile obtaining part 40.

Second Embodiment

Figure 15:
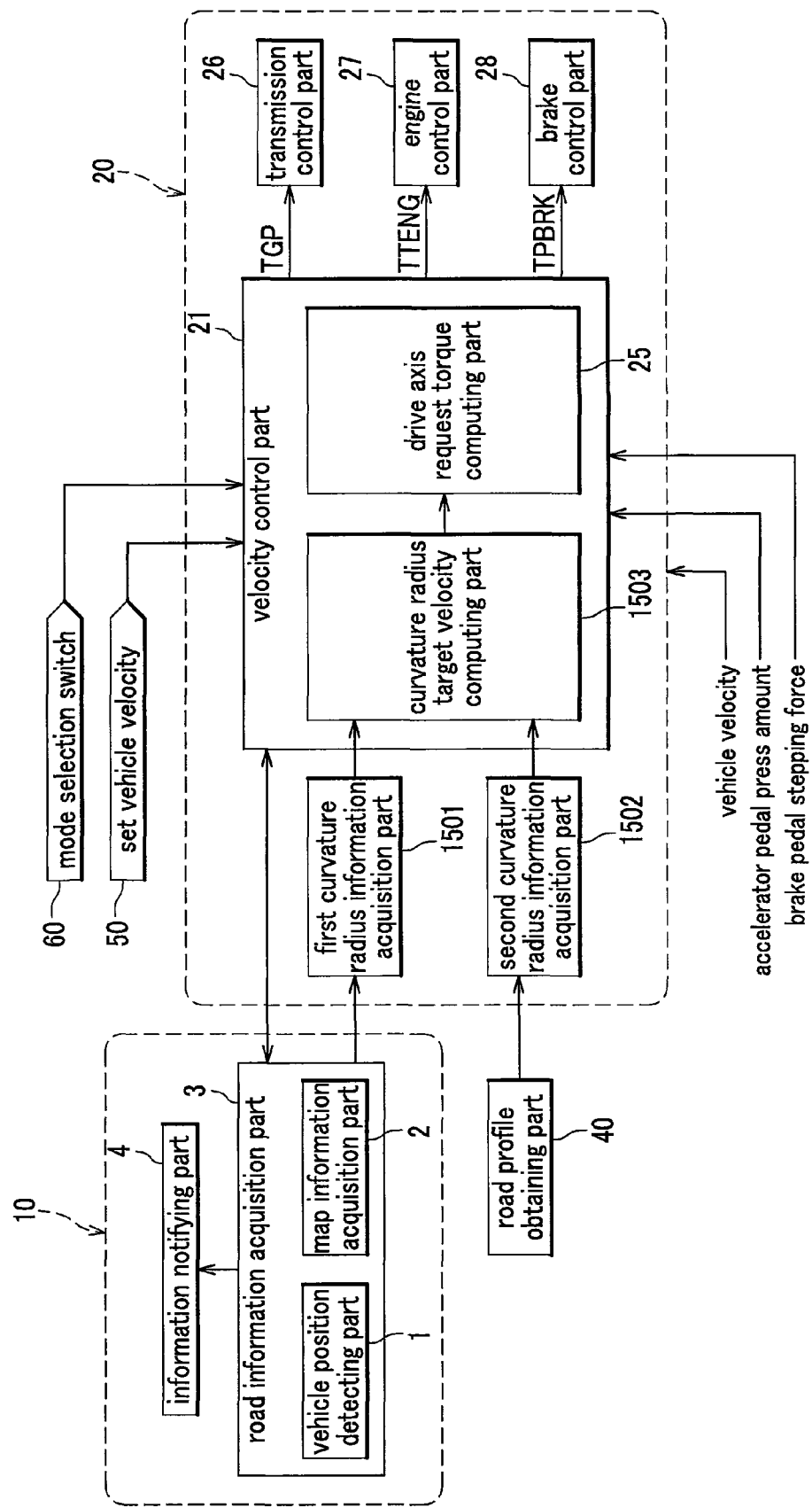
FIG. 15 is a schematic diagram showing a vehicle speed control system according to a second embodiment of the present invention.

FIG. 15 is a schematic diagram showing a vehicle speed control system according to a second embodiment of the present invention.

Configuration of FIG. 15 is substantially the same as the configuration of the first embodiment shown in FIG. 1, except that the first target velocity computing part 22, the second target velocity computing part 23 and the final target velocity computing part 24 are replaced with a first curvature radius information acquisition part 1501, a second curvature radius information acquisition part 1502 and a curvature radius target velocity computing part 1503, respectively. It should be noted that, though the first curvature radius information acquisition part 1501 and the second curvature radius information acquisition part 1502 are included in the speed controller 20, the first curvature radius information acquisition part 1501 may be included in the road information acquisition part 3, and the second curvature radius information acquisition part 1502 may be included in the road profile obtaining part 40.

The first curvature radius information acquisition part 1501 obtains curvature radius information from the road information obtained by the road information acquisition part 3, as first curvature radius information. Likewise, the second curvature radius information acquisition part 1502 obtains curvature radius information from the road profile information obtained by the road profile obtaining part 40 as second curvature radius information.

The curvature radius target velocity computing part 1503 receives the first curvature radius information and the second curvature radius information, computes a curvature radius target velocity based on the two curvature radiuses, and outputs the curvature radius target velocity to the drive axis request torque computing part 25.

Next, with reference to FIG. 16, a method for computing curvature radius target velocity will be explained, in which the computation is made in accordance with a first curvature radius information and a second curvature radius information, when a curved track is detected ahead of the vehicle.

Figure 16:
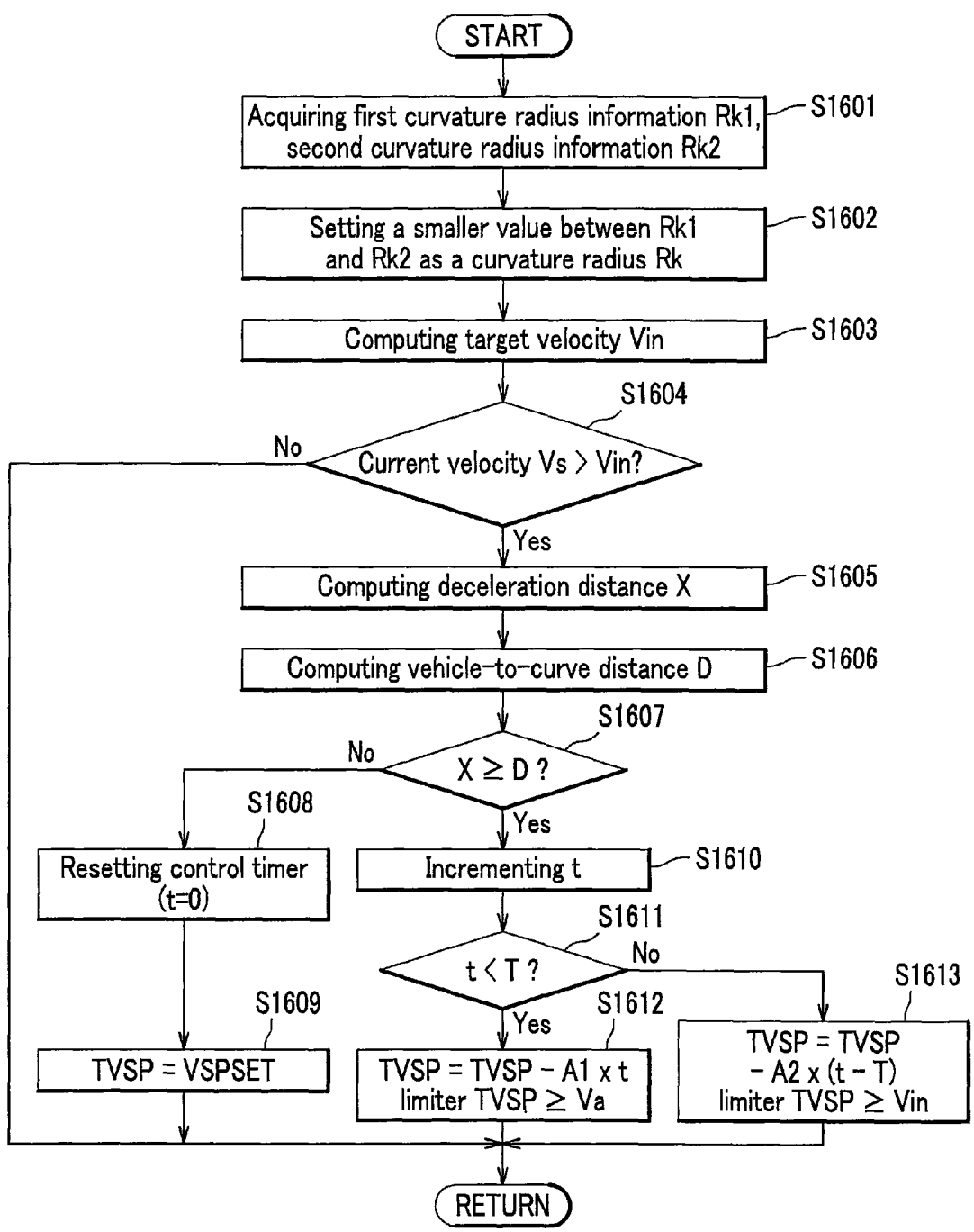
FIG. 16 is a flow chart showing processings of a curvature radius target velocity computing part 1503 in which two pieces of curvature radius information are compared to compute a target velocity.

FIG. 16 is a flow chart showing processings of a curvature radius target velocity computing part 1503.

First, the curvature radius target velocity computing part 1503 obtains a first curvature radius information Rk1 from the first curvature radius information acquisition part 1501 and a second curvature radius information Rk2 from the second curvature radius information acquisition part 1502 (S1601), and compares Rk1 and Rk2, to select a smaller value as a curvature radius Rk (S1602).

Next, the curvature radius target velocity computing part 1503 computes a target velocity Vin for entering the curve (S1603).

Next, the curvature radius target velocity computing part 1503 determines whether or not the current velocity Vs is larger than Vin (S1604). When the current velocity Vs is not larger than Vin (No at S1604), no deceleration is required, and thus the processing is terminated.

On the other hand, when the current velocity Vs is larger than Vin (Yes at S1604), the curvature radius target velocity computing part 1503 computes a deceleration distance X based on the velocity Vs and the target velocity Vin for entering the curve (S1604). The deceleration distance X is a distance required for deceleration from the vehicle velocity Vs to the target velocity Vin for entering the curve, when the vehicle decelerates at a specific rate. The deceleration distance X is calculated from an equation (9).

$$X=1/2 \times A1 \times T^2 + Vs \times T + (Va^2 - Vin^2)/(2 \times A2) \qquad (9)$$

Herein, A1 is a deceleration rate with which an initial engine brake is taken into account, and A2 is a deceleration rate with which a foot brake is taken into account. T is a duration time for a deceleration rate A1, which is desirably set while a time required for shifting an accelerator pedal to a brake pedal by the driver is taken into account. Vs is a velocity at a deceleration initiation, and Va is a velocity when the initial deceleration is terminated. The velocity Va is represented by an equation (10) using the deceleration rate A1 and the time T.

$$Va = Vs - A1 \times T \qquad (10)$$

After S1605, the curvature radius target velocity computing part 1503 computes a vehicle-to-curve distance D (S1606). The vehicle-to-curve distance D is a distance from the vehicle position to an entrance of the curve. In addition, the curvature radius target velocity computing part 1503 compares the deceleration distance X and the vehicle-to-curve distance D, and determines whether or not the vehicle reaches a deceleration initiation point (S1607).

When the deceleration distance X is shorter than the vehicle-to-curve distance D and it is determined that the vehicle does not reach the deceleration initiation point (No at S1607), the curvature radius target velocity computing part 1503 resets the time t of a control timer (t=0) (S1608). Then, a set vehicle velocity VSPSET (target velocity set by the driver through switch operation or the like) is substituted for the target velocity TVSP (S1609), and the processing is terminated.

When the deceleration distance X is equal to or longer than the vehicle-to-curve distance D, and it is determined that the vehicle reached the deceleration initiation point (Yes at S1607), the curvature radius target velocity computing part 1503 increments the time t (S161). When the time t is shorter than the time T (Yes at S1611), the curvature radius target velocity computing part 1503 computes the target velocity TVSP using a deceleration rate with which an engine brake is taken into account (S1612), and the processing is terminated. At S1612, the target velocity TVSP is computed using an equation (11), with the proviso that the lower limit of the target velocity TVSP is limited to a velocity Va which is a velocity at the termination of the initial deceleration.

$$TVSP(n) = TVSP(n-1) - A1 \times t \qquad (11)$$

On the other hand, when the time t is equal to or longer than the time T (No at S1611), the curvature radius target velocity computing part 1503 computes the target velocity TVSP using a deceleration rate with which a foot brake is taken into account (S1613), and the processing is terminated. At S1613, the target velocity TVSP is computed using an equation (12), with the proviso that the lower limit of the target velocity TVSP is limited to a target velocity Vin for entering the curve.

$$TVSP(n) = TVSP(n-1) - A2 \times (t-T) \qquad (12)$$

As described above, by the processing shown in FIG. 16, it becomes possible to set a target velocity for entering the curve in accordance with the road profile, using two pieces of curvature radius information.

It should be noted that, in the processing of FIG. 16, when a lower curvature radius is selected after the comparison between the first curvature radius information and the second curvature radius information, and the switching of curvature radius occurs therebetween, it is desirable to set the target velocity in such a manner that a transition of acceleration/deceleration of the vehicle does not include sudden change, as shown in the fourth example of velocity control.

Third Embodiment

Figure 17:
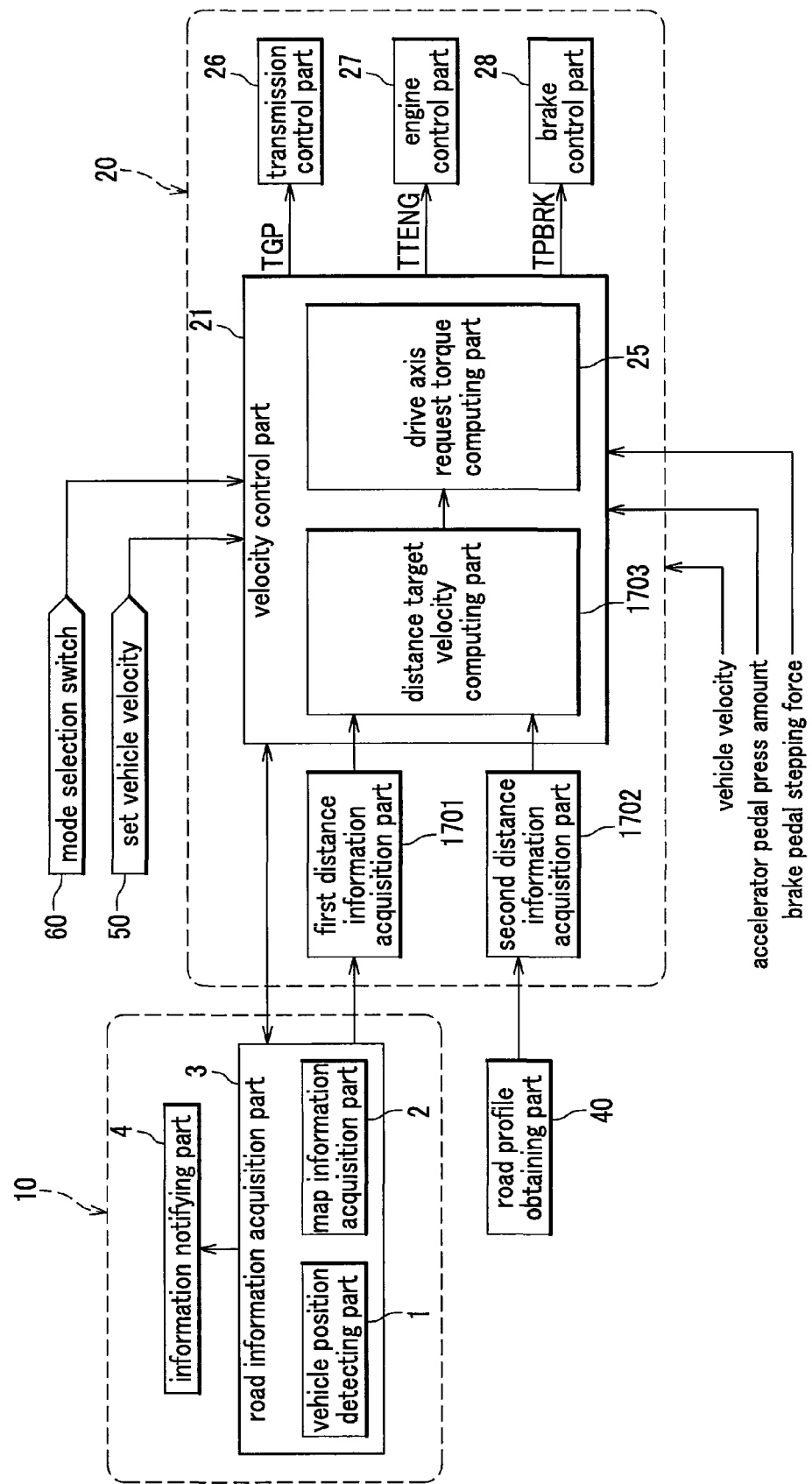
FIG. 17 is a schematic diagram showing a vehicle speed control system according to a third embodiment of the present invention.

FIG. 17 is a schematic diagram showing a vehicle speed control system according to a third embodiment of the present invention.

Configuration of FIG. 17 is substantially the same as the configuration of the first embodiment shown in FIG. 1, except that the first target velocity computing part 22, the second target velocity computing part 23 and the final target velocity computing part 24 are replaced with a first distance information acquisition part 1701, a second distance information acquisition part 1702 and a distance target velocity computing part 1703, respectively. It should be noted that, though the first distance information acquisition part 1701 and the second distance information acquisition part 1702 are included in the speed controller 20, the first distance information acquisition part 1701 may be included in the road information acquisition part 3, and the second distance information acquisition part 1702 may be included in the road profile obtaining part 40.

The first distance information acquisition part 1701 obtains distance information from the road information obtained by the road information acquisition part 3, as first distance information. Likewise, the second distance information acquisition part 1702 obtains distance information from the road profile obtained by the road profile obtaining part 40, as second distance information.

The distance target velocity computing part 1703 receives the first distance information and the second distance information, computes a distance target velocity based on the two pieces of distance information, and outputs the distance target velocity to the drive axis request torque computing part 25.

Next, with reference to FIG. 18, a method for computing distance target velocity will be explained, in which the computation is made in accordance with a first distance information and a second distance information, when a stop line is detected ahead of the vehicle.

Figure 18:
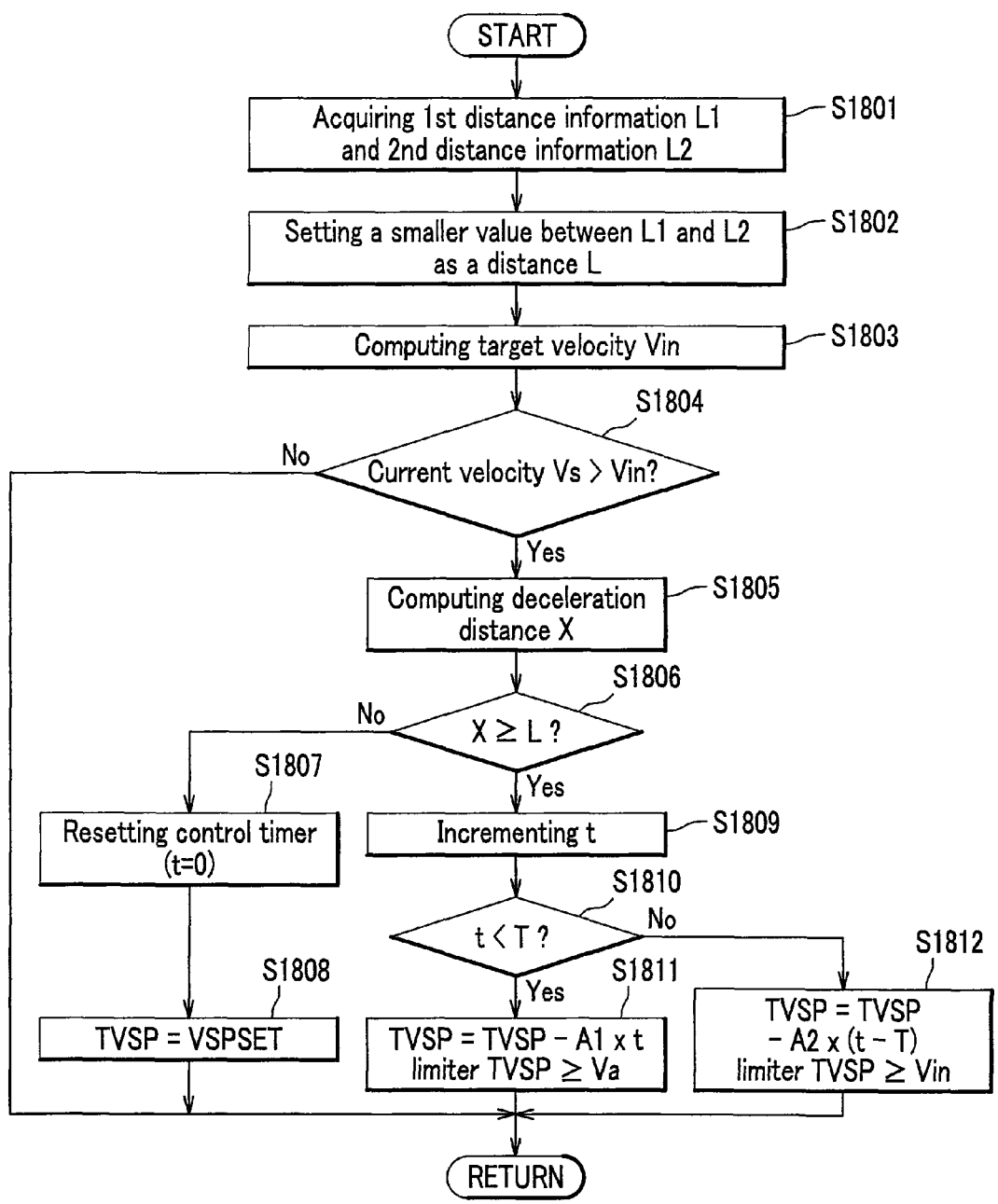
FIG. 18 is a flow chart showing processings of a distance target velocity computing part 1703 in which two pieces of distance information are compared to compute a target velocity (in a case of deceleration).

FIG. 18 is a flow chart showing processings of a distance target velocity computing part 1703, in a case where deceleration is implemented.

First, the distance target velocity computing part 1703 obtains a first distance information L1 from the first distance information acquisition part 1701, and a second distance information L2 from the second distance information acquisition part 1702 (S1801). Herein, each of the first distance information L1 and the second distance information L2 is a distance from the vehicle to the stop line.

Next, the distance target velocity computing part 1703 compares the first distance information L1 and the second distance information L2, to select a smaller value as a distance L (S1802), and in addition, computes a target velocity Vin at the stop line (S1803). Herein, the target velocity Vin is set to zero (Vin=0), in order to stop the vehicle at the stop line.

Next, the distance target velocity computing part 1703 determines whether or not the current velocity Vs is larger than Vin (S1804). When the current velocity Vs is not larger than Vin (No at S1804), no deceleration is required, and thus the processing is terminated.

On the other hand, when the current velocity Vs is larger than Vin (Yes at S1804), the distance target velocity computing part 1703 computes a deceleration distance X based on the velocity Vs and the target velocity Vin at the stop line (S1805). The deceleration distance X is a distance required for deceleration from the vehicle velocity Vs to the target velocity Vin at the stop line, when the vehicle decelerates at a specific rate. The deceleration distance X is calculated from an equation (13).

$$X = 1/2 \times A1 \times T^2 + Vs \times T + (Va^2 - Vin^2)/(2 \times A2) \quad (13)$$

Herein, A1 is a deceleration rate with which an initial engine brake is taken into account, and A2 is a deceleration rate with which a foot brake is taken into account. T is a duration time for a deceleration rate A1, which is desirably set while a time required for shifting an accelerator pedal to a brake pedal by the driver is taken into account. Vs is a velocity at deceleration initiation, and Va is a velocity when the initial deceleration is terminated. The velocity Va is represented by an equation (14) using the deceleration rate A1 and the time T.

$$Va = Vs - A1 \times T \quad (14)$$

After the deceleration distance X is computed at S1805, the step proceeds to S1806 at which the deceleration distance X and the distance L to the stop line are compared, and thereby whether or not the vehicle reaches the deceleration initiation point is determined.

When the deceleration distance X is shorter than the distance L to the stop line and it is determined that the vehicle does not reach the deceleration initiation point (No at S1806), the distance target velocity computing part 1703 resets the time t of a control timer (t=0) (S1807). Then, a set vehicle velocity VSPSET (target velocity set by the driver through switch operation or the like) is substituted for the target velocity TVSP (S1808), and the processing is terminated.

When the deceleration distance X is equal to or longer than the distance L to stop line, and it is determined that the vehicle reached the deceleration initiation point (Yes at S1806), the distance target velocity computing part 1703 increments the time t (S1809). In addition, when the time t is shorter than the time T (Yes at S1810), the distance target velocity computing part 1703 computes the target velocity TVSP using a deceleration rate with which an engine brake is taken into account (S1811), and the processing is terminated. At S1811, the target velocity TVSP is computed using an equation (15), with the proviso that the lower limit of the target velocity TVSP is limited to a velocity Va which is a velocity at the termination of the initial deceleration.

$$TVSP(n) = TVSP(n-1) - A1 \times t \quad (15)$$

On the other hand, when the time t is equal to or longer than the time T (No at S1810), the distance target velocity computing part 1703 computes a target velocity TVSP using a deceleration rate with which a foot brake is taken into account (S1812), and the processing is terminated. At S1812, the target velocity TVSP is computed using an equation (16), with the proviso that the lower limit of the target velocity TVSP is limited to a target velocity Vin at the stop line.

$$TVSP(n) = TVSP(n-1) - A2 \times (t-T) \quad (16)$$

As described above, by the processing shown in FIG. 18, it becomes possible to set a target velocity towards the stop line, using two pieces of distance information.

Next, with reference to FIG. 19, a method for computing distance target velocity will be explained, in which the computation is made in accordance with a first distance information and a second distance information, when a curve exit is detected ahead of the vehicle running on a curved track.

Figure 19:
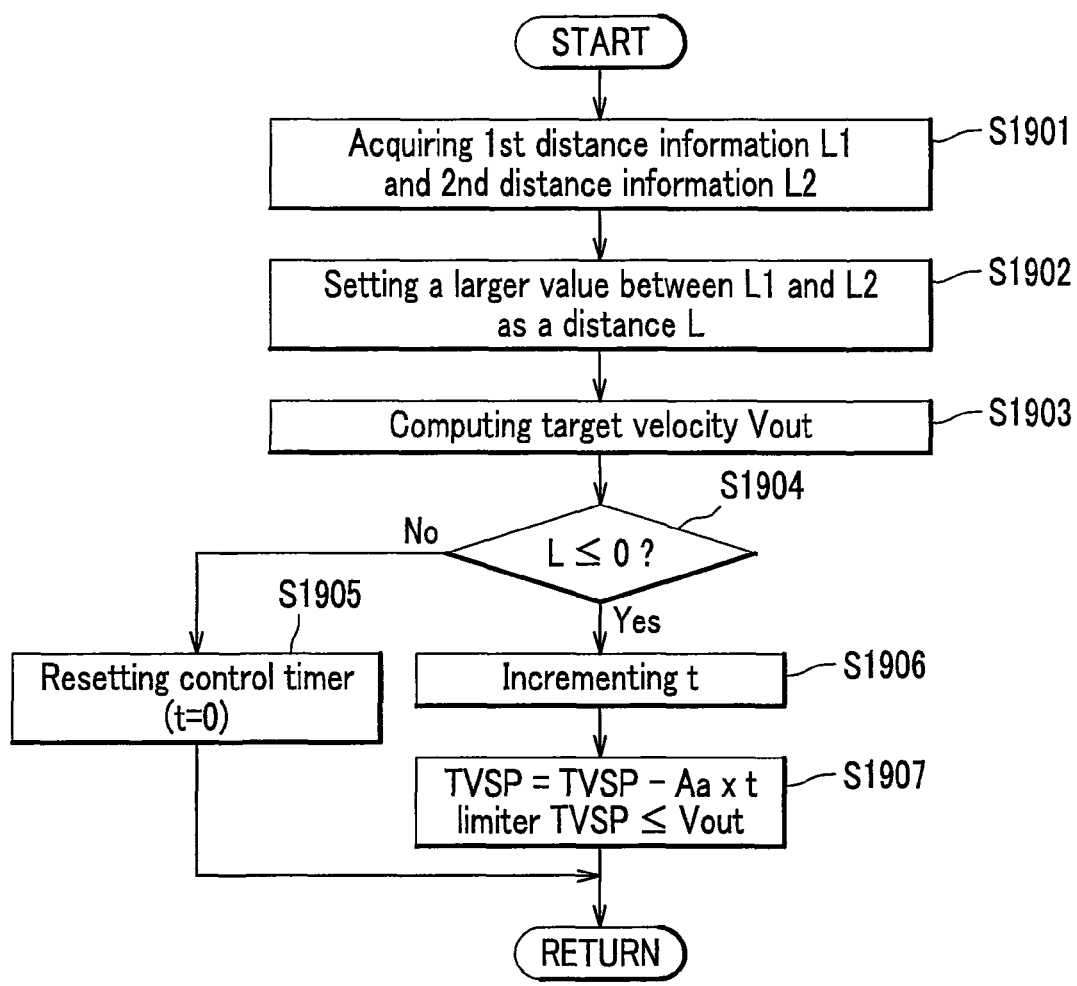
FIG. 19 is a flow chart showing processings of a distance target velocity computing part 1703 in which two pieces of distance information are compared to compute a target velocity (in a case of acceleration).

FIG. 19 is a flow chart showing processings of a distance target velocity computing part 1703, in a case where acceleration is implemented.

First, the distance target velocity computing part 1703 obtains a first distance information L1 from a first distance information acquisition part 1701 and a second distance information L2 from a second distance information acquisition part 1702 (S1901). Herein, each of the first distance information L1 and the second distance information L2 is a distance from the vehicle to the curve exit point.

Next, the distance target velocity computing part 1703 compares the first distance information L1 and the second distance information L2, to select a larger value as a distance L (S1902), and in addition, computes a target velocity Vout after the curve exit (S1903). Herein, if the road is a straight track after the curve exit, a set vehicle velocity VSPSET (target velocity set by the driver through switch operation or the like) or a speed limit for the straight track is set as the target velocity Vout. When the target velocity Vout is larger than the current velocity Vs, no deceleration is required, and thus the processing is terminated.

Next, the distance target velocity computing part 1703 determines whether or not the distance L to the curve exit point is larger than 0 (the vehicle reaches the curve exit point) (S1904). When the distance L is larger than 0 (No at S1904), the distance target velocity computing part 1703 resets a time t of the control timer (t=0) (S1905), and the processing is terminated.

When the distance L to the curve exit point is equal to or smaller than 0, and it is judged that the vehicle reached the acceleration initiation point (curve exit point) (Yes at S1904), the distance target velocity computing part 1703 increments the time t (S1906). In addition, a target velocity TVSP is computed using a specific deceleration rate (S1907) and the processing is terminated. At S1907, the target velocity TVSP is computed using an equation (17), with the proviso that the upper limit of the target velocity TVSP is limited to a target velocity Vout after the curve exit.

$$TVSP(n)=TVSP(n-1)+Aa\times t \quad (17)$$

As described above, by the processing shown in FIG. 19, it becomes possible to set a target velocity towards the curve exit, using two pieces of distance information.

It should be noted that, in the processings of FIGS. 18 and 19, when a target velocity is selected after the comparison between two pieces of distance information, and the switching of distance information occurs therebetween, it is desirable to set the target velocity in such a manner that a transition of acceleration/deceleration of the vehicle does not include sudden change, as shown in the fourth example of velocity control.

When the first distance information acquired by the first distance information acquisition part 1701 and the second distance information acquired by the second distance information acquisition part 1702 are compared and the second distance information is shorter, a road profile obtained by the road profile obtaining part 40 is used as a basis of the target velocity determination. In this case, by correcting the map information stored in the navigation system in accordance with the road profile obtained by the road profile obtaining part 40, more stable running can be notified to the driver/passenger, and thus secure feeling of the driver/passenger can be improved.

In addition, in order to implement velocity control for more stable running, it is desirable that other vehicles other than the vehicle that has been described herein follow the road profile obtained by the road profile obtaining part 40, and that information of the road profile obtained by the road profile obtaining part 40 be transmitted to other vehicles through communication, such as radio transmission.

Figure 20:
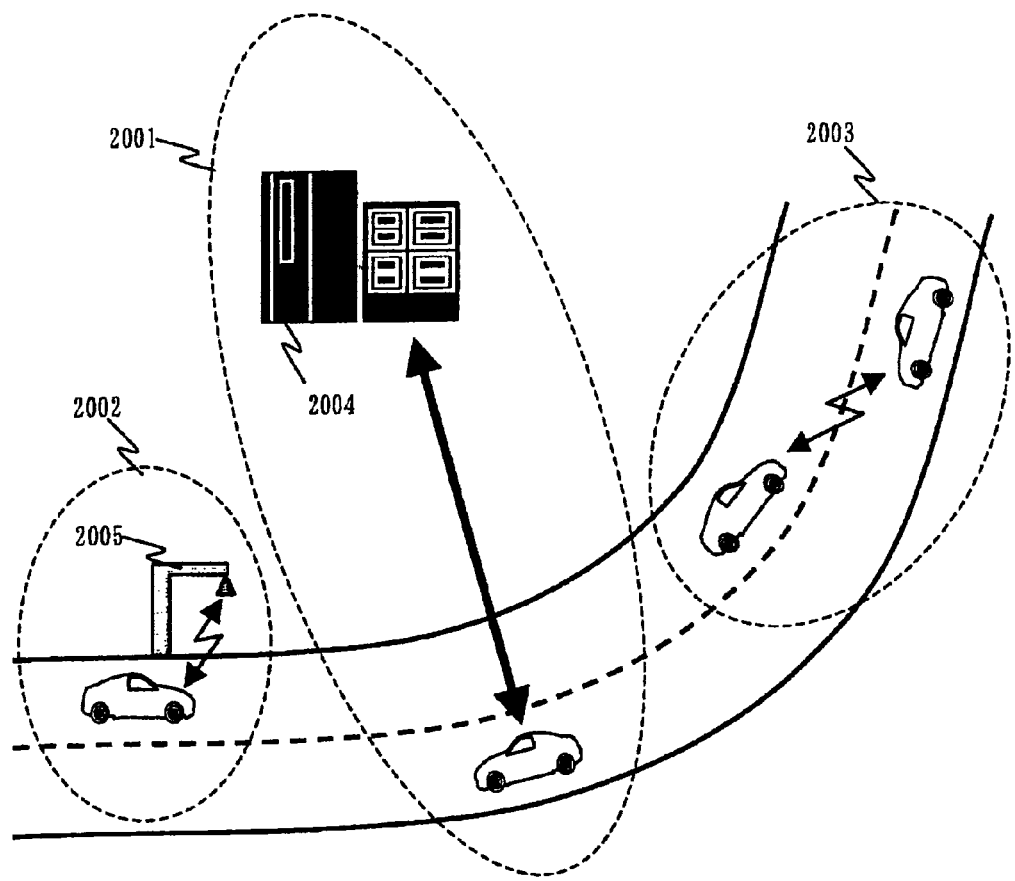
FIG. 20 is a schematic diagram showing communication between a vehicle and an information center, road-to-vehicle communication, and vehicle-to-vehicle communication.

FIG. 20 shows a schematic diagram showing information communication.

In FIG. 20, an area surrounded by a dotted line 2001 includes communication between a vehicle and an information center 2004, where road information is transmitted to each other. An area surrounded by a dotted line 2002 includes communication between a vehicle and a roadside communication device 2005, which is generally called road-to-vehicle communication. An area surrounded by a dotted line 2003 includes communication between vehicles, which is generally called vehicle-to-vehicle communication.

As described above, by communication with an information center, with a roadside device and between vehicles and transmitting map information therebetween, map information can be updated in advance. Therefore, more assured and stable velocity control can be implemented and at the same time, secure feeling of the driver/passenger can be improved.

It should be noted that, in the present example, a system for controlling velocity before the vehicle enters a curve has been described (in the third embodiment, stop line and curve exit have been described) as one illustration of the system. However, the present invention is applicable to a system for controlling velocity by utilizing information of an intersection, such as a T-shaped intersection and a crossroad, a school zone and a speed limit. In addition, the description is made with respect to a method for controlling deceleration, but the present invention is applicable to a method for controlling acceleration.

When the driving control of the vehicle is implemented by the speed control system of the present invention, and in addition, a vehicle stabilization controller, such as VDC (Vehicle Dynamics Control), mounted on the vehicle is activated, it is desirable that the driving control of the vehicle by the speed control system of the present invention be canceled and the vehicle be manually operated by the driver. Likewise, when ABS (Anti-lock Brake System: an electronic control system for preventing tires from being locked, when a strong braking force that may cause locking of wheels is applied while running) or TCS (Traction Control System: a system for preventing wheels from running idle when the vehicle starts off or while running) is additionally activated, it is desirable that the driving control by the speed control system in the present invention be canceled and the vehicle be manually operated by the driver. It is noted that when the driving control of the vehicle by the speed control system of the present invention is canceled, secure feeling of the driver can be improved by notifying the driver with a warning beep by the on-board terminal 10. As described above, if the running state of the vehicle is not stable and the above-mentioned systems are activated, by not implementing the driving control of the vehicle by the vehicle speed control system of the present invention, safeness is secured.

In the on-board terminal 10, such as car navigation system, the road information obtained by the road information acquisition part 3 and various pieces of information computed by the speed controller 20 may be notified to the driver/passenger by voice message or display message on an LCD panel. For example, a road profile ahead of the vehicle (curved track, sloped track or the like), presence/absence of a toll booth, presence/absence of a fork road/merging road may be notified, and in a case of a curved track detected ahead of the vehicle, the vehicle-to-curve distance D, the target velocity Vin for entering the curve and the like described with reference to FIG. 4 may be notified to the driver/passenger. Further, the first target velocity computed by the first target velocity computing part 22 and the second target velocity computed by the second target velocity computing part 23 are notified to the driver/passenger. In this manner, various pieces of information can be notified in advance to the driver/passenger, leading to improvement of secure feeling.

The embodiments of the present invention have been described above. However, the present invention is not limited to the above embodiments, and it is a matter of course that the above embodiment may be properly modified within the scope of the present invention.

For example, the curve entrance point may be determined in the following manner.

According to Japanese Road Construction Ordinance, between a straight section and an arc section of a road, a transition (easement) section with gradual curvature change should be provided. First, property of the transition section will be described. For geometrically describing the transition section, clothoid curve is used, which is represented by an equation (18) where R is a curvature radius, L is a curve length and A is a clothoid parameter.

$$R \times L = A^2 \qquad (18)$$

In general, an X-Y coordinate of the clothoid curve is calculated from polynominal of equations (19) and (20).

$$X = L^2/6R \times (1 - L^2/56R^2 + L^4/7040R^4 - L^6/1612800 R^6 \ldots) \qquad (19)$$

$$Y = L \times (1 - L^2/40R^2 + L^4/3456R^4 - L^6/599040R^6 \ldots) \qquad (20)$$

It is apparent from the equation (18) that, when the curve length L is sufficiently shorter relative to the clothoid parameter A, the curvature radius R becomes sufficiently large, and therefore, second or later terms in the equations (19) and (20) can be ignored. As a result, the X-Y coordinate of the clothoid curve can be approximated by equations (21) and (22).

$$X = L^2/6R \qquad (21)$$

$$Y = L \qquad (22)$$

By substituting the equation (22) for the equations (18) and (21), the curvature radius R is canceled, and an equation (23) is obtained.

$$Y^3 = 6A^2 \times X \qquad (23)$$

As shown above, when the curve length L is sufficiently short and the curvature radius R is sufficiently large, the clothoid curve (transition curve) can be approximated and represented by the cubic equation (23).

Figure 21:
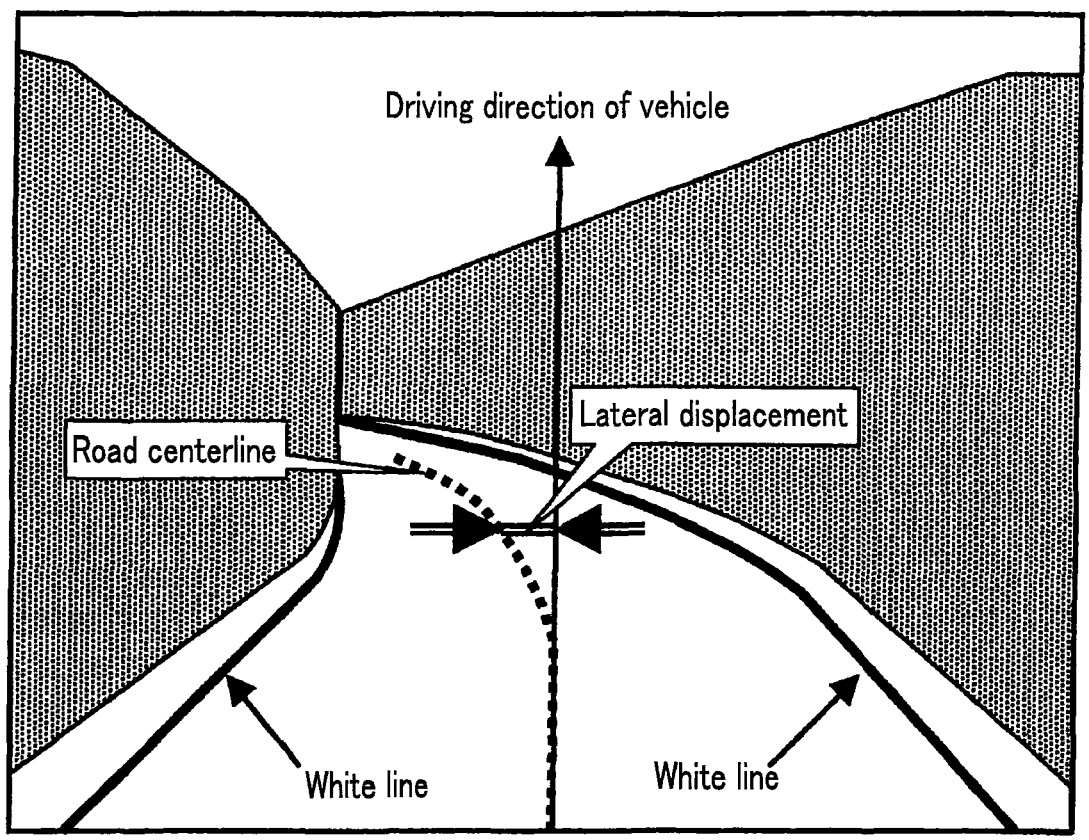
FIG. 21 illustrates an image taken by a camera and shows a lateral displacement.

In order to estimate the property of the transition curve as described above, information of lateral displacement computed form information of image taken by a camera is utilized. The term "lateral displacement" herein means a distance from a line drawn in a driving direction to a road centerline, as shown in FIG. 21. Here, the road centerline is computed based on the detection result of the white lines captured on both sides of the road.

Figure 22:
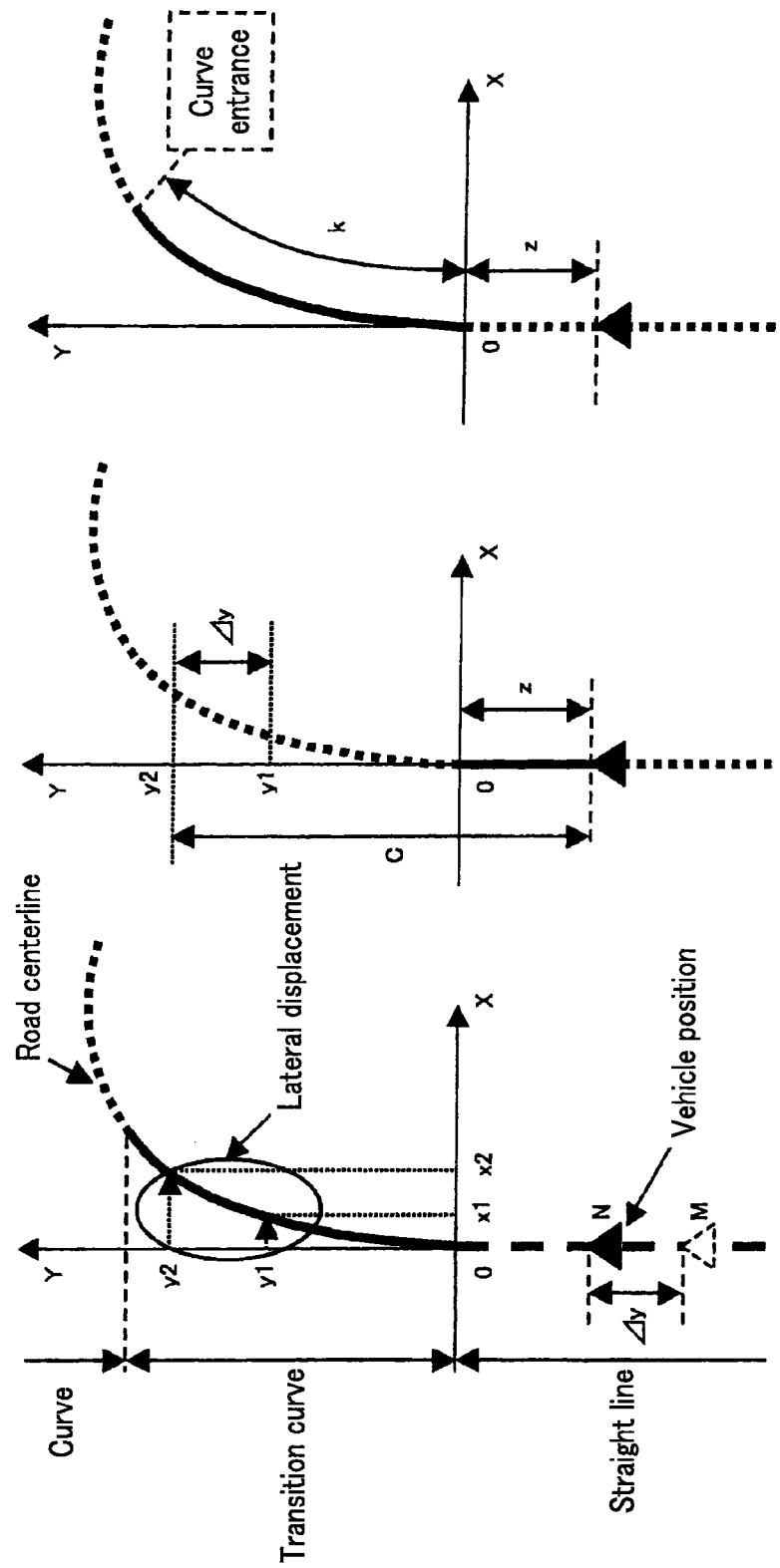
FIG. 22 illustrates a method for judging a curve entrance based on property of a transition curve.

FIG. 22 illustrates a method for calculating a distance to a curve entrance based on the property of the transition curve. Referring to (a) of FIG. 22, a curve indicated with a solid line is the transition curve, and the property of the transition curve is estimated by utilizing lateral displacements along the transition curve. When X1 is defined as a lateral displacement detected at a point M, and X2 is defined as a lateral displacement detected at a point N which is ahead of the point M by Δy, equations (24) and (25) are obtained from the equation (23).

$$y1^3 = 6A^2 \times x1 \qquad (24)$$

$$y2^3 = 6A^2 \times x2 \qquad (25)$$

By eliminating A from the equations (24) and (25), an equation (26) is obtained.

$$\left(\frac{y_1}{y_2}\right)^3 = \frac{x_1}{x_2} \therefore \frac{y_1}{y_2} = \sqrt[3]{\frac{x_1}{x_2}} = e \qquad (26)$$

The letter "e" in the equation (26) indicates the property of the transition curve, which is obtained by detecting a lateral displacement between two points on the transition curve.

Referring to (b) of FIG. 22, y1 and y2 are represented by equations (27) and (28), respectively, using a distance C for detecting lateral displacement by a camera and a travel distance Δy, and a distance z from the vehicle position to the transition curve.

$$y1 = C - \Delta y - z \qquad (27)$$

$$y2 = C - z \qquad (28)$$

where the travel distance Δy is represented by an equation (29) using a vehicle velocity VSP.

$$\Delta y = \int VSP \, dt \qquad (29)$$

By substituting the equations (27) and (28) into the equation (26), the distance z from the vehicle position to the transition curve is represented by an equation (30).

$$z = \frac{(1-e) \times C - \Delta y}{1 - e} \qquad (30)$$

In addition, from the equations (25) and (28), a clothoid parameter A is represented by an equation (31).

$$A^2 = \frac{(C-z)^3}{6x_2} \qquad (31)$$

Accordingly, a distance k from a starting point of the transition curve to a curve entrance, as shown in (c) of FIG. 22, can be represented by an equation (32), using a curvature radius Rin at the curve entrance from the equation (18).

$$k = \frac{A^2}{R_{in}} \qquad (32)$$

From the above, a distance Din from the vehicle position to the curve entrance can be represented by an equation (33) with z and k, and therefore, it becomes possible to determine the curve entrance utilizing the property of a transition section.

$$Din = z + k \qquad (33)$$

In addition, it becomes possible to predict a curve entrance ahead of a range C captive by the camera, and thus to switch target velocity at an early stage.

Sixth Example of Velocity Control

Next, as a sixth example of velocity control, a method for controlling a vehicle will be explained in which information of a curve entrance point obtained by the road information acquisition part 3 does not match information of a curve entrance point obtained by the road profile obtaining part 40.

Figure 23:
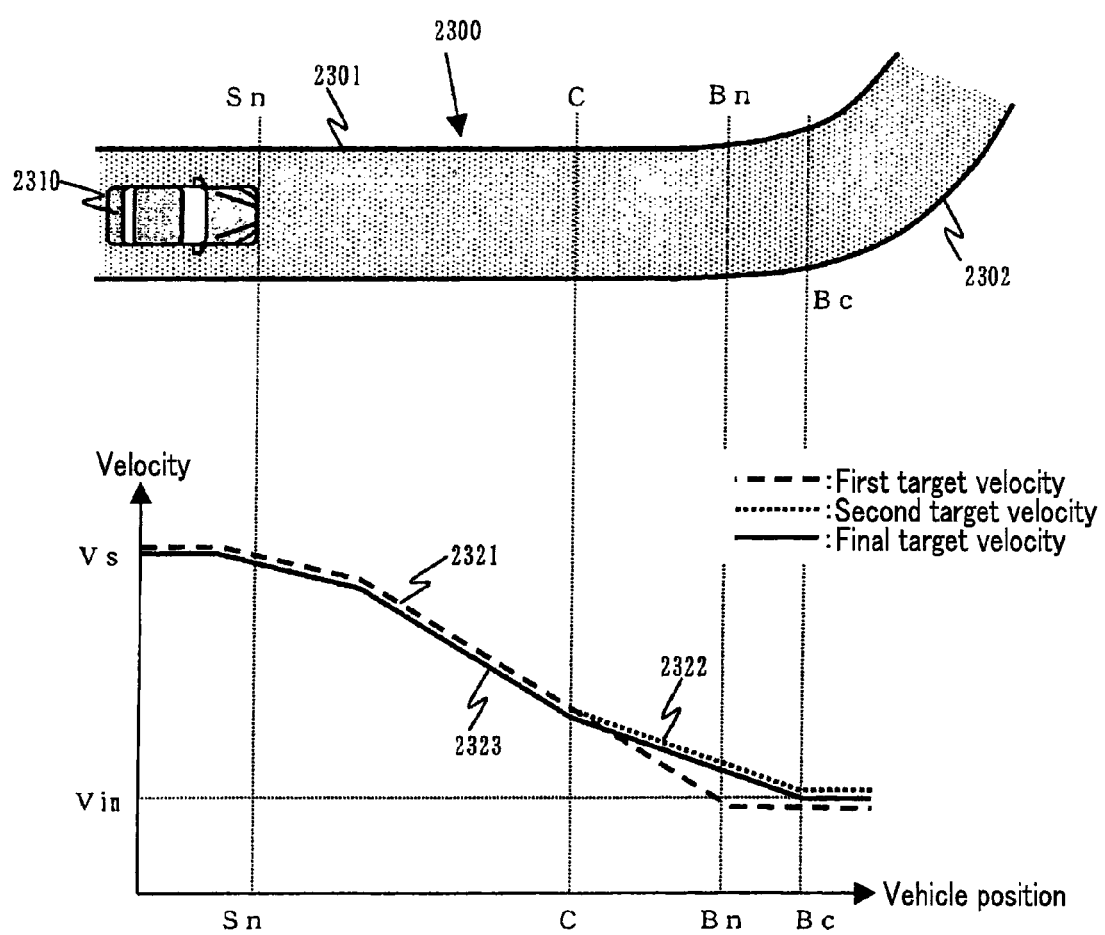
FIG. 23 shows a diagram of a road condition ahead of a vehicle and a graph showing a control transition in a case where switching of a target velocity is implemented when two pieces of information regarding a curve entrance point are different.

FIG. 23 shows a diagram of a road condition ahead of a vehicle and a graph showing a control transition of a target velocity. In FIG. 23, a vehicle 2310 is running on a road 2300 composed of a straight track 2301 and a curved track 2302.

First, the first target velocity is computed by the first target velocity computing part 22 in such a manner that deceleration starts at a point Sn and is completed at a point Bn. Herein, the point Bn is an entrance point of the curve obtained by the road information acquisition part 3. In FIG. 23, the first target velocity is indicated with a dashed line 2321.

The second target velocity is computed by the second target velocity computing part 23 using only the information of the close range with high reliability, as in the case of the third example of velocity control illustrated in FIG. 10. Either the second target velocity is not computed up to the point C where a location of a curve entrance is determined based on property of a transition section present before the curve entrance obtained using a camera, or the target velocity for a straight track is output. In the former case, as indicated with a dotted line 2322 in FIG. 23, when the vehicle reached the point C, the second target velocity is computed in such a manner that deceleration is completed at the point Bc.

If the reliability of the second target velocity is high, the second target velocity is taken as a final target velocity. The final target velocity is indicated with a solid line 2323 in FIG. 23. It should be noted that the distance between the point C where the curve entrance is predictable and the point Bc is longer than a range captive by the camera, and therefore it becomes possible to switch target velocity at an early stage.

As described above, deceleration is implemented in advance in accordance with the first target velocity, and the second target velocity is computed by utilizing property of the transition curve. If the reliability of the second target velocity is high, the target velocity is switched to the second target velocity and deceleration in accordance with the second target velocity can be implemented. Accordingly, when the vehicle enters the curve, the deceleration is completed before the real curve entrance, and thus both stability and comfortability can be realized.

In addition, in the method for judging curve entrance by utilizing property of the transition section as described above, detection of lateral displacement by a camera may be obtained for two points at a time. Alternatively, instead of using the information of the lateral displacement detected by the camera, the information of the curvature detected by the camera is utilized for estimating property of the transition section, and based on the estimation, the curve entrance may be determined. In addition, for obtaining the road profile, sensors other than camera can be used. Any means can be used, as long as property of the transition section can be estimated and the curve entrance can be predicted.

What is claimed is:

1. A vehicle speed control system comprising:
    a first acquisition part for acquiring a current position;
    a second acquisition part for acquiring map information;
    a sensor mounted on the vehicle for detecting objects installed along a road;
    a first road profile estimating part for obtaining a first road profile ahead of the current position based on the map information;
    a first target velocity calculation part for computing a first target velocity based on the first road profile;
    a second road profile estimating part for obtaining a second road profile ahead of the current position based on information detected by the sensor, without using the map information;
    a second target velocity calculation part for computing a second target velocity based on the second road profile; and
    a velocity control part for
        comparing the first target velocity and the second target velocity,
        selecting a lower target velocity therefrom, and
        controlling a vehicle velocity in accordance with the selected target velocity.

2. The vehicle speed control system according to claim 1, wherein the sensor detects a traffic lane.

3. The vehicle speed control system according to claim 1, further comprises a notifying part for notifying information to a driver/passenger in accordance with the first target velocity or the second target velocity.

4. The vehicle speed control system according to claim 1, wherein the velocity control part comprises an acceleration/deceleration limiting part for limiting acceleration or deceleration within a specific range, when the vehicle velocity is switched between the first target velocity and the second target velocity.

5. The vehicle speed control system according to claim 4, wherein the acceleration/deceleration limiting part maintains at least one of a driving force and a braking force generated by at least one of an engine and a braking device of the vehicle within a specific range.

6. The vehicle speed control system according to claim 4, wherein the acceleration/deceleration limiting part generates a target velocity pattern with a target velocity gradually changing at a transition between the first target velocity and the second target velocity, while acceleration or deceleration is maintained within a specific range.

7. The vehicle speed control system according to claim 1, further comprising a road profile evaluating part for evaluating reliability of the obtained first road profile,
    wherein, when the road profile evaluating part evaluates that the reliability of the obtained first road profile is low, the velocity control part cancels the control of the vehicle velocity.

8. The vehicle speed control system according to claim 7, wherein, when the road profile evaluating part evaluates the reliability of the obtained first road profile is low, the velocity control part cancels the control of the vehicle velocity, after controlling the vehicle velocity so as not to generate a sudden change in a transition of acceleration/deceleration.

9. The vehicle speed control system according to claim 7, further comprising a cancellation notifying part for notifying a driver or a passenger by warning beep or display message that the control of the vehicle velocity by the velocity control part will be canceled.

10. The vehicle speed control system according to claim 7, wherein, in a case where the road profile evaluating part evaluates the reliability of the obtained first road profile is low and the control of the vehicle velocity is canceled, the velocity control part resumes the control of the vehicle velocity, when the road profile evaluating part evaluates the reliability of the obtained first road profile is high.

11. The vehicle speed control system according to claim 10, further comprising a resumption notifying part for notifying a driver or a passenger by warning beep or display message that the control of the vehicle velocity by the velocity control part will be resumed.

12. The vehicle speed control system according to claim 1, wherein the second road profile estimating part obtains the second road profile by estimating property of a transition section of the road.

13. The vehicle speed control system according to claim 12, wherein the second road profile estimating part estimates a road profile of a road ahead of the current position, based on the first road profile obtained by the first road profile estimating part and the property of the transition section of the road.

14. The vehicle speed control system according to claim 13, wherein the velocity control part controls the vehicle velocity in accordance with the first target velocity, and when reliability of the second target velocity becomes high, switches the first target velocity to the second target velocity, and controls the vehicle velocity in accordance with the second target velocity.

* * * * *